(12) United States Patent
Itoh et al.

(10) Patent No.: US 10,301,123 B2
(45) Date of Patent: May 28, 2019

(54) TRANSFER DEVICE

(71) Applicant: ITOH DENKI CO., LTD., Kasai-shi, Hyogo (JP)

(72) Inventors: Kazuo Itoh, Kasai (JP); Tatsuhiko Nakamura, Hyogo (JP); Jun Maekawa, Takasago (JP)

(73) Assignee: Itoh Denki Co., Ltd. (JP)

( * ) Notice: Subject to any disclaimer, the term of this patent is extended or adjusted under 35 U.S.C. 154(b) by 0 days.

(21) Appl. No.: 16/034,911

(22) Filed: Jul. 13, 2018

(65) Prior Publication Data
US 2018/0319605 A1 Nov. 8, 2018

Related U.S. Application Data

(62) Division of application No. 15/113,193, filed as application No. PCT/JP2015/051993 on Jan. 26, 2015, now Pat. No. 10,053,300.

(30) Foreign Application Priority Data

| Jan. 28, 2014 | (JP) | ................................ | 2014-013835 |
| Feb. 28, 2014 | (JP) | ................................ | 2014-039735 |
| Feb. 28, 2014 | (JP) | ................................ | 2014-039736 |

(51) Int. Cl.
*B65G 13/07* (2006.01)
*B65G 13/10* (2006.01)
(Continued)

(52) U.S. Cl.
CPC ............. *B65G 47/54* (2013.01); *B65G 13/07* (2013.01); *B65G 13/10* (2013.01); *B65G 15/12* (2013.01); *B65G 2207/18* (2013.01)

(58) Field of Classification Search
CPC ........ B65G 47/54; B65G 13/07; B65G 13/10; B65G 15/12; B65G 2207/18
(Continued)

(56) References Cited

U.S. PATENT DOCUMENTS

| 4,730,718 A | 3/1988 | Fazio et al. |
| 6,360,869 B1 | 3/2002 | Itoh et al. |
| | (Continued) | |

FOREIGN PATENT DOCUMENTS

| JP | 672607 A | 3/1994 |
| JP | 6115679 A | 4/1994 |
| | (Continued) | |

OTHER PUBLICATIONS

International Search Report, dated Apr. 14, 2015, in International Patent Application No. PCT/JP2015/051993.
(Continued)

*Primary Examiner* — Mark A Deuble
(74) *Attorney, Agent, or Firm* — Wood, Phillips, Katz, Clark & Mortimer

(57) ABSTRACT

A transfer device having: a frame; a main conveyer unit having a main conveying passage disposed in a fixed planar area; and a sub conveyer unit having a sub conveying passage disposed in a planar area identical to the planar area of the main conveying passage and conveying an object in a direction crossing a conveying direction of the main conveying passage. A lifting and lowering unit lifts one of the conveying passages to a position above the other conveying passage. A regulating unit is provided for allowing linear upward and downward movement of at least one of the conveyer units. The regulating unit is a plate body or a linear body that bends and/or tilts. A bending direction or a tilting direction is aligned with an upward and downward movement direction of the main conveyer unit or the sub conveyer unit.

10 Claims, 24 Drawing Sheets

(51) Int. Cl.
*B65G 15/12* (2006.01)
*B65G 47/54* (2006.01)

(58) Field of Classification Search
USPC .......................................... 198/809
See application file for complete search history.

(56) References Cited

U.S. PATENT DOCUMENTS

| | | | |
|---|---|---|---|
| 7,681,710 | B2 | 3/2010 | Kuhn et al. |
| 9,290,333 | B2 | 3/2016 | Skanse et al. |
| 9,365,361 | B1 | 6/2016 | Skarlupka |
| 9,617,083 | B2 | 4/2017 | Itoh et al. |
| 9,676,563 | B2 | 6/2017 | Itoh et al. |
| 10,053,300 | B2 * | 8/2018 | Itoh .................. B65G 47/54 |
| 2005/0040016 | A1 | 2/2005 | Tasma et al. |
| 2005/0077145 | A1 | 4/2005 | Evans et al. |
| 2012/0048678 | A1 | 3/2012 | Itoh et al. |
| 2014/0041989 | A1 * | 2/2014 | Wallace .................. B65G 47/54 |
| | | | 198/369.1 |

FOREIGN PATENT DOCUMENTS

| | | |
|---|---|---|
| JP | 2000-168948 A | 6/2000 |
| JP | 2001-225946 A | 8/2001 |
| JP | 2003-112821 A | 4/2003 |
| JP | 2005-280857 A | 10/2005 |
| JP | 2012-051679 A | 3/2012 |
| JP | 2013-230914 A | 11/2013 |

OTHER PUBLICATIONS

International Preliminary Report on Patentability and Written Opinion, dated Aug. 2, 2016 in International Patent Application No. PCT/JP2015/051993.

Supplementary European Search Report, dated Aug. 24, 2017, in EP 15 74 4073.

* cited by examiner

TRANSFER DEVICE

TECHNICAL FIELD

The present invention relates to a transfer device constituting a part of a conveyer line, and more particularly to a transfer device capable of switching a conveying direction of an object to be conveyed to a direction crossing the conveying direction.

BACKGROUND ART

An object to be handled in a product assembly line or delivered in an conveyed object delivery site is often conveyed on a conveyer line. In a delivery site, for example, a large number of conveyer lines are equipped lengthwise and crosswise. A transfer device is disposed at each of the cross points of the conveyer lines. The transfer device has a function of transferring an conveyed object from an original conveyer line (main conveyer line) to a different conveyer line (sub conveyer line) for transfer of the conveyed object to a desired position.

The transfer device includes two conveyer units for conveying an conveyed object, and a lifting and lowering unit for changing a height position of the conveyer units to perform the foregoing function. Each of the two conveyer units includes a conveying passage on which an object is placed and conveyed. The conveying directions of the conveying passages of the two conveyer units differ from each other. According to this transfer device, relative heights of the two conveying passages are switchable by using the foregoing lifting and lowering unit.

The lifting and lowering unit of the transfer device of this type retracts a top surface of the conveying passage of the conveyer unit not contributing to conveyance to a position below a conveying surface of the conveyer line, and lifts a top surface of the conveyer unit contributing to conveyance to the conveying surface side of the conveyer line to expose this surface. In this condition, the conveyer unit lifted to the conveying surface side operates (travels) to allow smooth conveyance without obstruction by the conveying unit not contributing to conveyance.

The transfer device further includes a regulating unit which allows upward and downward movement of each of the two conveyer units in a straight line.

In general, the regulating unit is a linear guide constituted by an erect pin or shaft, and a bearing member which slides the pin by engagement therewith.

For example, Patent Document 1 discloses a technology of the transfer device of this type.

In addition, Patent Document 2 discloses a multistage conveyer system which conveys objects on multiple conveyer devices overlapped with each other in the up-down direction.

PRIOR DOCUMENTS

Patent Documents

Patent Document 1: JP-2012-51679-A
Patent Document 2: JP-2001-225946-A

DISCLOSURE OF INVENTION

Technical Problem

There is a problem arising from the conventional transfer device and desired to be solved, in the point that the overall height of the transfer device is higher than heights of other parts of the conveyer line.

More specifically, the conventional transfer device which constitutes a part of the conveyer line as described above has a great overall height, and therefore increases the height of the entire conveyer line. In this case, the overall height of the conveyer line equipped with the transfer device is determined based on the height at the portion of the transfer device.

When a part of the conveyer line (main conveyance part) other than the transfer device is constituted by a roller conveyer, for example, the height of the main part of the conventional conveyer line only has a length slightly larger than the outside diameter of a roller. When the main conveyance part is constituted by a belt conveyer, for example, the overall height of the main conveyance part of the conventional conveyer line only has a length slightly larger than the outside diameter of each pulley at both ends.

However, the conventional transfer device has a greater overall height than the height of the conveyer of the main conveyance part. Accordingly, the conventional transfer device is difficult to constitute a part of the multistage conveyer system as disclosed in Patent Document 2.

The present invention has been developed in consideration of the aforementioned problems arising from the conventional technology. An object of the present invention is to provide a transfer device having an overall height lower than that of a conventional transfer device.

Solution to Problem

For achieving the above object, a transfer device in an aspect includes a main conveying unit having a plurality of main conveying bodies that rotate or travel in contact with a conveyed object to convey the object in a fixed direction, a sub conveying unit having a plurality of sub conveying bodies that rotate or travel in contact with the conveyed object to carry the object in a direction crossing the conveying direction of the main conveying unit, and a lifting and lowering unit having a lifting and lowering mechanism for lifting and lowering at least one of the main conveying unit and the sub conveying unit, and a motor for operating the lifting and lowering mechanism, the main conveying unit and the sub conveying unit being disposed in an identical planar area, the lifting and lowering unit lifting one of the conveying units to a position above the other conveying unit to convey the object in a desired direction, wherein a planar position of the motor resides in a planar area overlapping with the main conveying unit and the sub conveying unit, and wherein a position of the motor in a height direction is set such that a part or the whole of the motor is located above a height of a lower end of a rotational track or a traveling track of any one of the conveying bodies of any one of the conveying units in a lowered state.

According to the transfer device of this aspect, the planar position of the motor resides in the planar area overlapping with the main conveying unit and the sub conveying unit. In this case, an area occupied by the transfer device decreases. Moreover, the position of the motor in the height direction is set such that a part or the whole of the motor is located above the height of the lower end of the rotational track or the traveling track of any of the conveying bodies in the lowered state of any one of the conveying units. This structure considerably decreases the height of the transfer device, and therefore allows reduction of the overall height of the transfer device.

In a preferable aspect, the conveying bodies of one of the conveying units are rotating bodies composed of rollers or small rotating body groups coaxially arranged whereas the conveying bodies of the other conveying unit are narrow conveyers having a small width, the rotating bodies are disposed in parallel with a fixed interval whereas the narrow conveyers are disposed between the rotating bodies and appear from between the rotating bodies, and a position of a part or the whole of the motor in the height direction is higher than a height of a lowermost end of the rotating bodies, and higher than a height of a lower end of a rotational track or traveling track of the narrow conveyers.

According to the transfer device of this aspect, the conveying bodies of one of the conveying units are constituted by rotating bodies that are rollers or a small rotating body group coaxially arranged. The other conveying units are narrow conveyers having a small width. The rotating bodies are disposed in parallel in a state that a fixed interval is left between each other. The narrow conveyers are disposed between the rotating bodies and appear from the clearances between the rotating bodies. Accordingly, when lifting either the one conveying unit or the other conveying unit, this structure allows the object to be conveyed in the conveying direction of the corresponding conveying unit.

Moreover, the position of a part or the whole of the motor in the height direction is higher than the height of the lowermost end of the rotating bodies, and higher than the height of the lower end of the rotational track or traveling track of the narrow conveyers. Accordingly, the overall height of the transfer device can decrease.

In a preferable aspect, the lifting and lowering unit includes a geared motor, a power transmission shaft transmitted rotational force from the geared motor, a pinion gear attached to the power transmission shaft, and a rack engaging with the pinion gear, an output shaft of the geared motor and the power transmission shaft have a skew positional relationship, the power transmission shaft is disposed below the output shaft of the geared motor, and the rack is formed in a downward direction.

According to the transfer device of this aspect, the output shaft of the geared motor and the power transmission shaft have a skew positional relationship. The power transmission shaft is disposed below the output shaft of the geared motor. The rack engaging with the pinion gear is formed in the downward direction. In this case, the geared motor is located at a height overlapping with the rack. Accordingly, the overall height of the transfer device of this aspect decreases.

In a preferable aspect, the conveying bodies of one of the conveying units are rotating bodies composed of rollers or small rotating body groups coaxially arranged, the rotating bodies are disposed in parallel with a fixed interval, and a driving motor that drives the rotating bodies is disposed in a plane identical to a plane of the respective rotating bodies.

According to the transfer device of this aspect, the conveying bodies of the conveying unit composed of the rotating bodies, and the driving motor are disposed in the identical plane. Accordingly, the overall height of the transfer device can decrease.

In a preferable aspect, one of the main conveying unit and the sub conveying unit is a roller conveyer device that includes a plurality of rollers disposed in parallel whereas the other conveying unit is a belt conveyer device including a plurality of belts disposed in parallel, the belts composing the belt conveyer device are disposed between the rollers composing the roller conveyer device, a traveling track of each of the belts includes a conveying passage side on which the conveyed object is placed, and a return side that passes below the conveying passage side, a narrow part coming close to the conveying passage side is formed in the return side of at least one of the belts for a predetermined length in the conveying direction of the conveyed object, and the motor is disposed at the narrow part.

In a preferable aspect, one of the main conveying unit and the sub conveying unit is a roller conveyer device that includes a plurality of rollers disposed in parallel whereas the other conveying unit is a belt conveyer device including a plurality of belt conveyers disposed in parallel, the belts composing the belt conveyer device are disposed between the rollers composing the roller conveyer device, and the motor is disposed in parallel with the rollers of the roller conveyer device, and between the rollers.

In a preferable aspect, at least one of the main conveying unit and the sub conveying unit includes a regulating unit provided for allowing linear upward and downward movement, and a frame, the regulating unit is a plate body or a linear body that bends and/or tilts, and the regulating unit is attached between the frame and the main conveying unit or the sub conveying unit in such a posture that a bending direction or a tilting direction is aligned with an upward and downward movement direction of the main conveying unit or the sub conveying unit.

A transfer device in a still further preferable aspect includes a frame, a main conveyer unit having a main conveying passage disposed in a fixed planar area and conveying a conveyed object in a fixed direction, a sub conveyer unit having a sub conveying passage disposed in a planar area identical to the planar area of the main conveying passage and conveying the object in a direction crossing the conveying direction of the main conveying passage, a lifting and lowering unit for lifting or lowering at least one of the main conveyer unit and the sub conveyer unit, the lifting and lowering unit lifting one of the conveying passages to a position above the other conveying passage to convey the object in a desired direction; and a regulating unit provided for allowing linear upward and downward movement of at least one of the main conveyer unit and the sub conveyer unit, wherein the regulating unit is a plate body or a linear body that bends and/or tilts, and wherein the regulating unit is attached between the frame and the main conveyer unit or the sub conveyer unit in such a posture that a bending direction or a tilting direction is aligned with an upward and downward movement direction of the main conveyer unit or the sub conveyer unit.

The transfer device in the aspect described above is characterized by including the regulating unit provided for allowing linear upward and downward movement of at least one of the main conveyer unit and the sub conveyer unit, and the frame. The regulating unit is a plate body or a linear body that bends and/or tilts. The regulating unit is attached between the frame and the main conveyer unit or the sub conveyer unit in such a posture that the bending direction or the tilting direction is aligned with the upward and downward movement direction of the main conveyer unit or the sub conveyer unit.

According to the transfer device of this aspect, the regulating unit is composed of a plate body or a linear body that bends and/or tilts in the fixed direction.

According to the transfer device of this aspect, the regulating unit is attached between the frame and the main conveyer unit or the sub conveyer unit in such a posture that the bending direction or the tilting direction is aligned with the upward and downward movement direction of the main conveyer unit or the sub conveyer unit.

The regulating unit of the transfer device in this aspect is constituted by a plate body or a linear body which has an extremely low height. This structure allows reduction of the overall design height of the transfer device.

In a preferable aspect, the regulating unit is a plate body that has elasticity and bends in a fixed direction, and the regulating unit is attached between the frame and the main conveying unit or the sub conveying unit in such a posture that a bending direction is aligned with an upward and downward movement direction of the main conveying unit or the sub conveying unit.

According to the transfer device of this aspect, the regulating unit is composed of a plate body that has elasticity and bends in the fixed direction.

According to the transfer device of this aspect, the regulating unit is attached between the frame and the main conveying unit or the sub conveying unit in such a posture that the bending direction is aligned with the upward and downward movement direction of the main conveying unit or the sub conveying unit.

When the conveying unit of the transfer device in this aspect moves upward, the regulating unit bends in a downward convex posture, for example. When the conveying unit moves downward, the regulating unit bends in an upward convex posture, for example.

The whole shape of the regulating unit having a plate shape bends in a downward convex posture or an upward convex posture, but does not easily come into a twisted posture. This structure allows upward and downward movement of the conveying unit in a straight line.

Moreover, the regulating unit composed of a plate body has a considerably low height. This structure therefore reduces the design overall height of the transfer device.

In a preferable aspect, a plurality of the regulating units are provided between the frame and the main conveying unit or the sub conveying unit.

The transfer device of this aspect includes the plurality of regulating units. This structure further completely prevents movement of the conveying unit in the planar direction. Moreover, the regulating units each of which is composed of a plate body as described above do not considerably affect the overall height even when the number of the regulating units increases.

In a preferable aspect, one of the main conveying unit and the sub conveying unit is a roller conveyer device that includes a plurality of rollers disposed in parallel, the other conveying unit is a belt conveyer device including a plurality of belt conveyers disposed in parallel, the belts composing the belt conveyer device are disposed between the rollers constituting the roller conveyer device, and tension is constantly applied to the belts by a tensioner.

According to the transfer device of this aspect, one of the conveying units is composed of a belt conveyer device that includes a plurality of belt conveyers disposed in parallel. Tension is constantly applied to the belts by a tensioner. This structure reduces looseness of the belts, therefore facilitating maintenance.

Effect of Invention

According to the transfer device of the present invention, the planar position of a motor operating a lifting and lowering mechanism resides in a planar area overlapping with a main conveying body and a sub conveying body. In addition, the motor and respective conveying units overlap with each other in the height direction without interference with each other. Accordingly, the overall height decreases without increasing an occupancy area of the transfer device.

BRIEF DESCRIPTION OF DRAWINGS

FIGS. 6A through 6C are explanatory views showing a relationship between the respective conveyer units and horizontal movement members when both the main conveyer unit and the sub conveyer unit reside at an intermediate height, wherein FIG. 6A illustrates a state of the main conveyer unit, FIG. 6B illustrates a state of the sub conveyer unit, and FIG. 6C illustrates a relationship between cam followers belonging to the respective conveyer units and the horizontal movement members.

FIGS. 7A through 7C are explanatory views showing a relationship between the respective conveyer units and the horizontal movement members when the main conveyer unit and the sub conveyer unit reside at a lifted position and a lowered position, respectively, wherein FIG. 7A illustrates a state of the main conveyer unit, FIG. 7B illustrates a state of the sub conveyer unit, and FIG. 7C illustrates a relationship between the cam followers belonging to the respective conveyer units and the horizontal movement members.

FIGS. 8A through 8C are explanatory views showing a relationship between the respective conveyer units and horizontal movement members when the main conveyer unit and the sub conveyer unit reside at a lowered position and a lifted position, respectively, wherein FIG. 8A illustrates a state of the main conveyer unit, FIG. 8B illustrates a state of the sub conveyer unit, and FIG. 8C illustrates a relationship between the cam followers belonging to the respective conveyer units and the horizontal movement members.

FIGS. 10A through 10C are views of the regulating unit illustrated in FIG. 9, wherein FIG. 10A is a plan view, FIG. 10B is a front view, and FIG. 10C is a side view, each view shows the regulating unit in a natural state.

FIGS. 11A through 11C are views of the regulating unit illustrated in FIG. 9, wherein FIG. 11A is a plan view, FIG. 11B is a front view, and FIG. 11C is a side view, each view shows the regulating unit in a bended and upward convex state by application of external force to the regulating unit.

FIGS. 12A through 12C are views of the regulating unit illustrated in FIG. 9, wherein FIG. 11A is a plan view, FIG. 11B is a front view, and FIG. 11C is a side view, each view shows the regulating unit in a bended and downward convex state by application of external force to the regulating unit.

FIGS. 13A through 13C are explanatory views illustrating models of the main conveyer unit or the sub conveyer unit, a main frame, and the four regulating units to show a relationship between each other, wherein FIG. 13A is a plan view, FIG. 13B is a cross-sectional view in a state that the main conveyer unit or the sub conveyer unit is moving downward, and FIG. 13C is a cross-sectional view in a state that the main conveyer unit or the sub conveyer unit is moving upward.

FIGS. 14A through 14C are explanatory views illustrating models of the main conveyer unit, the sub conveyer unit, the main frame, and the four regulating units to show a relationship between each other, wherein FIG. 14A is a plan view, FIG. 14B is a cross-sectional view in a state that the sub conveyer unit is moving upward, and that the main conveyer unit is moving downward, and FIG. 14C is a cross-sectional view in a state that the main conveyer unit is moving upward, and that the sub conveyer unit is moving downward.

FIGS. 22A through 22C are views of the transfer device illustrated in FIG. 2, wherein FIG. 22A is a plan view, FIG. 22B is a front view, and FIG. 22C is a cross-sectional view taken along a line A-A in FIG. 22A.

FIGS. 27A through 27D illustrate a modified example of the regulating unit, wherein FIG. 27A is a perspective view, FIG. 27B is a cross-sectional view in a state that the main conveyer unit or the sub conveyer unit is in a lowered state, FIG. 27C is a cross-sectional view in a state that the main conveyer unit or the sub conveyer unit is in a lifted state, and FIG. 27D is a transverse sectional view of the regulating unit.

FIGS. 28A through 28D illustrate a modified example of the regulating unit, wherein FIG. 28A is a perspective view, FIG. 28B is a cross-sectional view in a state that the main conveyer unit or the sub conveyer unit is in a lowered state, FIG. 28C is a cross-sectional view in a state that the main conveyer unit or the sub conveyer unit is in a lifted state, and FIG. 28D is a transverse sectional view of the regulating unit.

FIGS. 29A through 29C are explanatory views showing models of the main conveyer unit or the sub conveyer unit, the main frame, and a plurality of linear regulating units to explain a relationship between each other, wherein FIG. 29A is a plan view, FIG. 29B is a cross-sectional view in a state that the main conveyer unit or the sub conveyer unit is in a lowered state, and FIG. 29C is a cross-sectional view in a state that the main conveyer unit or the sub conveyer unit is in a lifted state.

BEST MODE FOR CARRYING OUT THE INVENTION

Figure 1:
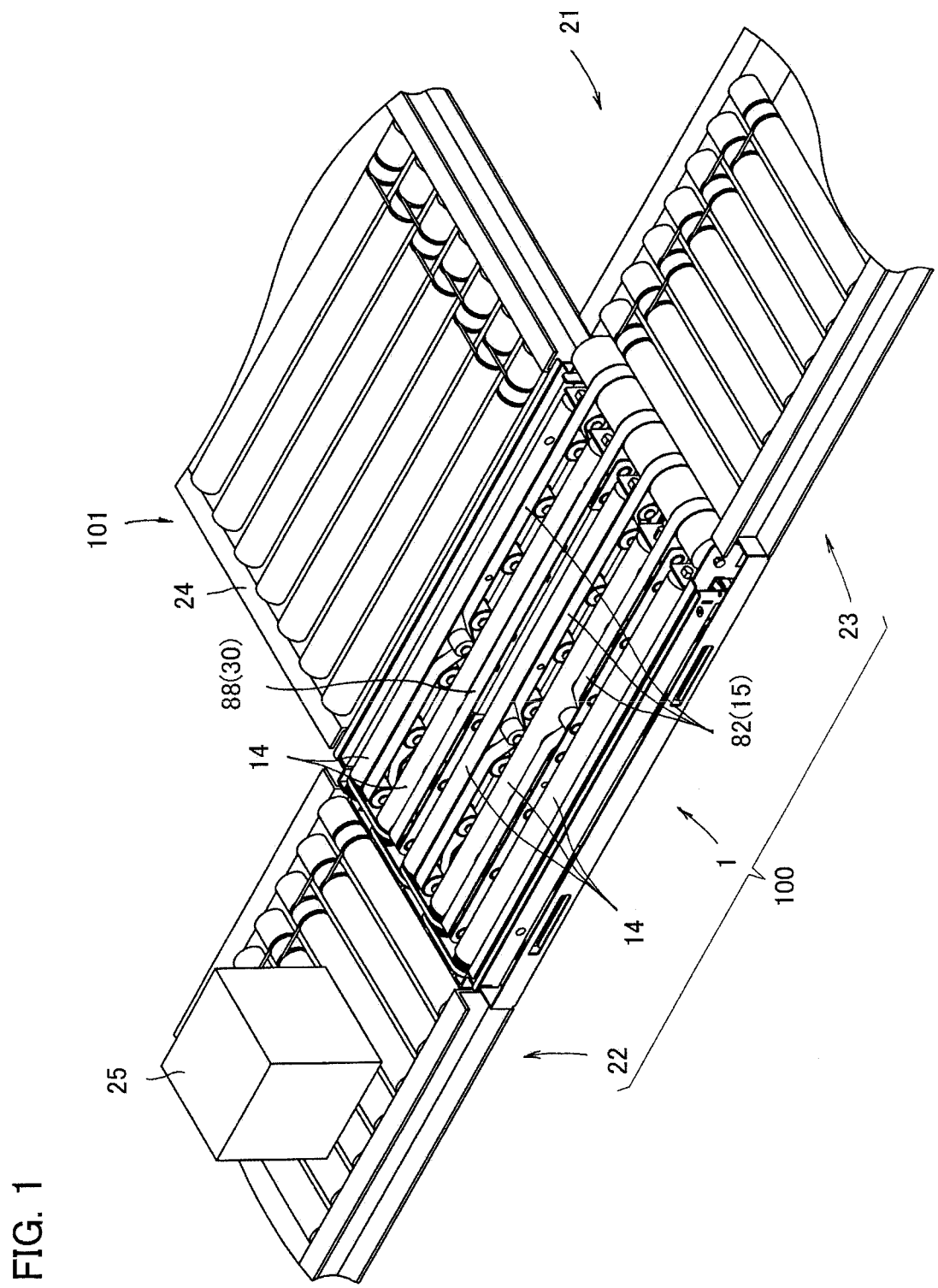
FIG. 1 is a perspective view of a conveyer line including a transfer device according to an embodiment of the present invention.

A transfer device 1 according to an embodiment of the present invention is hereinafter further detailed. The transfer device 1 of this embodiment includes a large number of parts. Each of the parts has a shape not only complicated but also tangled. For easy understanding of the invention, the outline and characteristic configurations of the transfer device are initially described. After clarifying these, specific configurations of the respective parts are sequentially explained.

As illustrated in FIGS. 2, 3, 4, and 5, the transfer device 1 according to this embodiment includes a sub conveyer unit (sub conveying unit) 2, a main conveyer unit (main conveying unit) 3, a lifting and lowering unit, and a geared motor 5. The transfer device 1 according to this embodiment further includes regulating units 72 and 73 for allowing straight and linear upward and downward movement of the sub conveyer unit 2 and the main conveyer unit 3.

Figure 3:
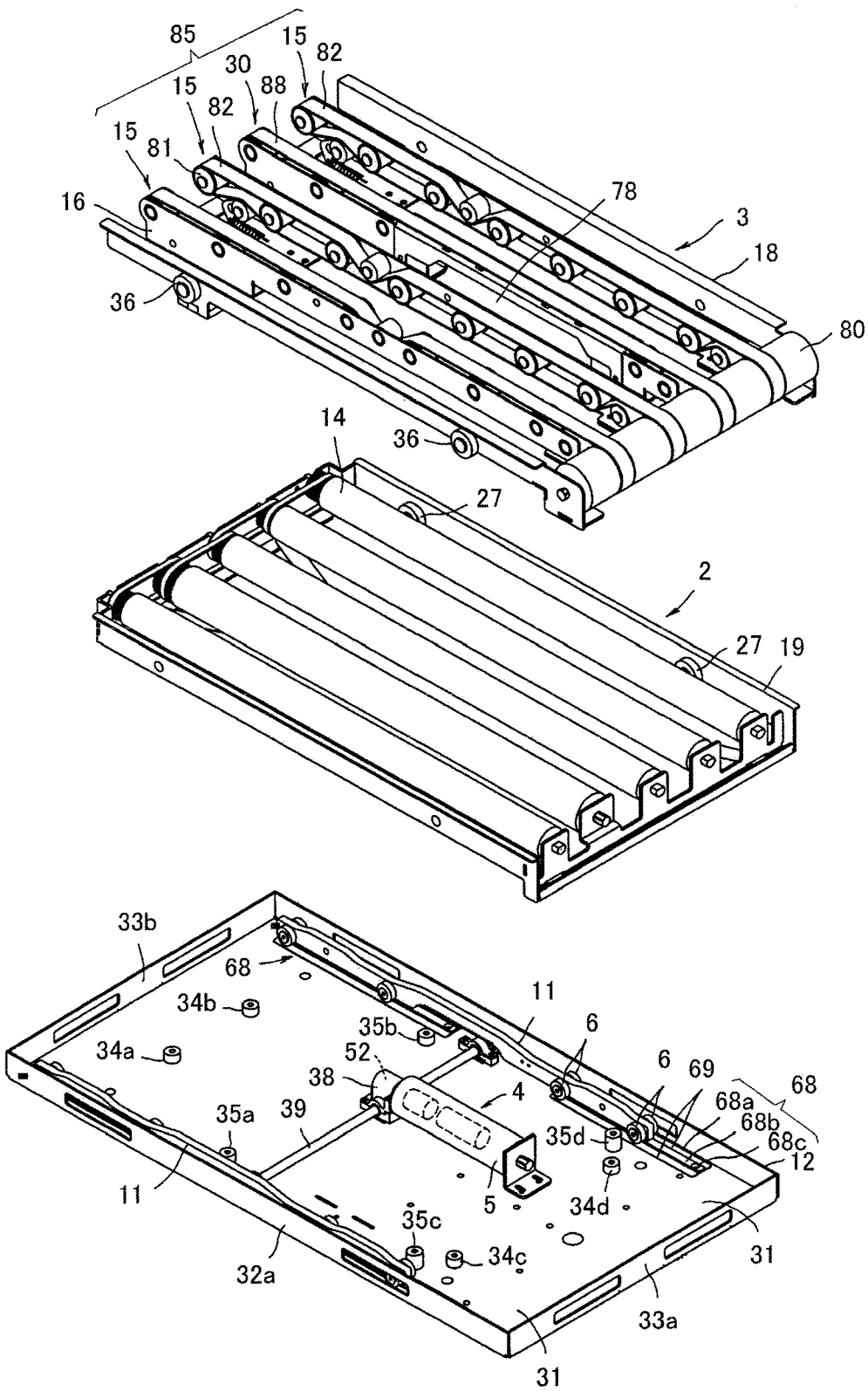
FIG. 3 is an exploded perspective view of the transfer device according to the embodiment of the present invention.
Figure 4:
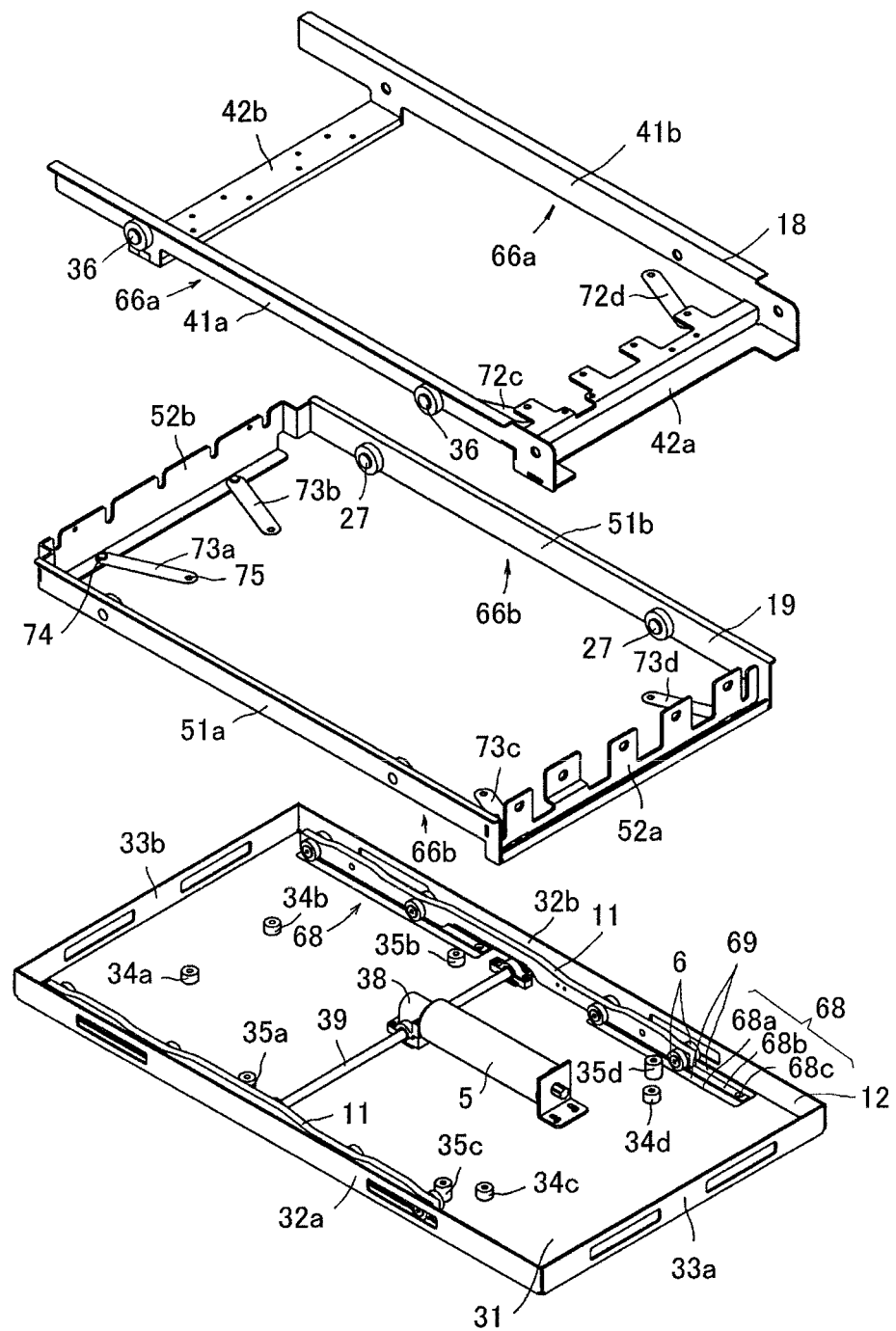
FIG. 4 is an exploded perspective view of the transfer device, showing only frames of respective conveyer units, and removing belts and the like of a main conveyer unit and rollers and the like of a sub conveyer unit from the exploded perspective view in FIG. 3.
Figure 21:
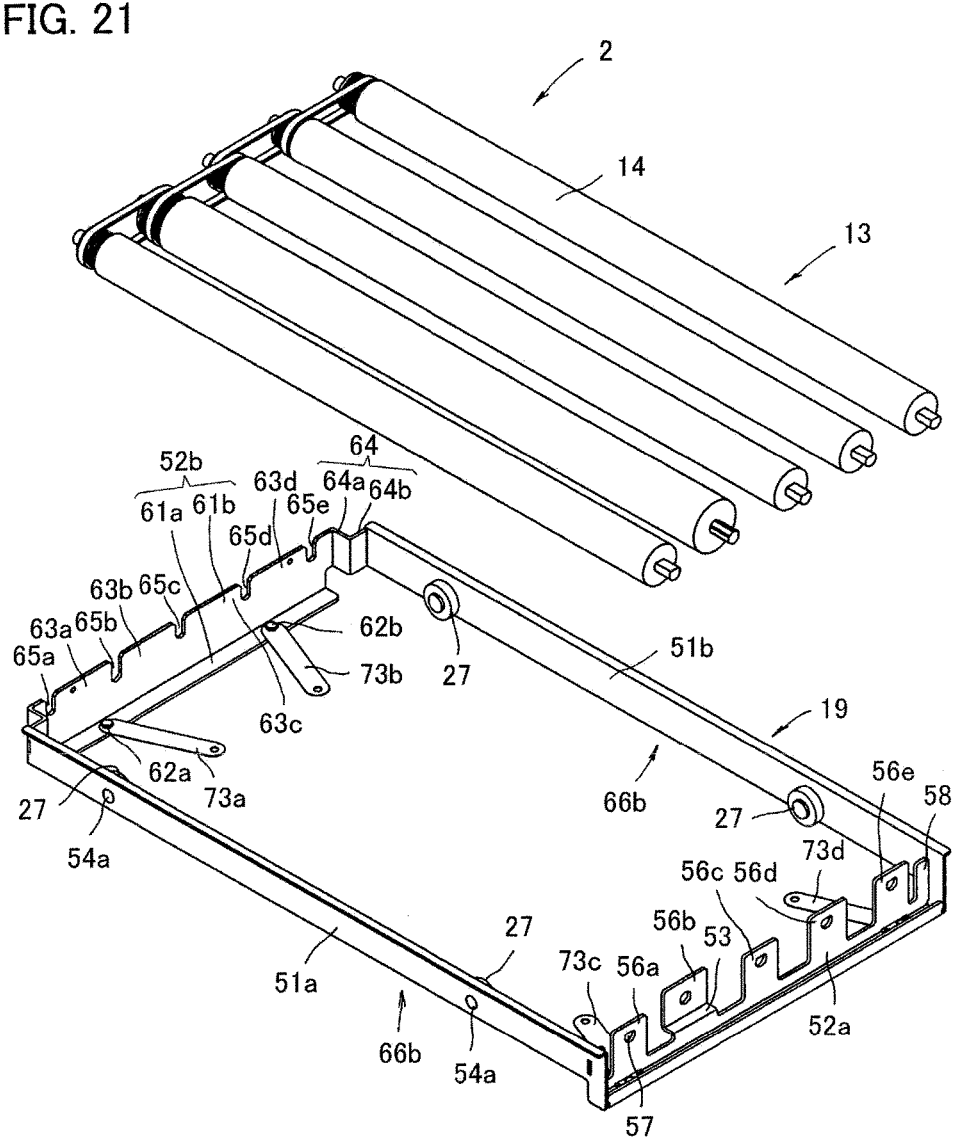
FIG. 21 is an exploded perspective view of the sub conveyer unit.

As illustrated in FIGS. 3 and 21, the sub conveyer unit 2 of the transfer device 1 includes a plurality of conveying rollers 14, and a roller side frame 19 for supporting the conveying rollers 14 such that the conveying rollers 14 are rotatable. As illustrated in FIG. 4, cam followers 27 are provided at four points of a lower portion of the roller side frame 19. Each of the cam followers 27 is constituted by a short roller. The sub conveyer unit 2 is a unit constituted by the roller side frame 19, and the plurality of conveying rollers 14 and the four cam followers 27 combined with the roller side frame 19 into one body.

At least one of the plurality of conveying rollers 14 is a driving roller, while the others are following rollers. Power is transmitted between the driving roller and the following rollers via belts. The driving roller is a motor-incorporating roller which contains a motor and a speed reducer within a roller main body.

The sub conveyer unit 2 includes a conveying passage constituted by the plurality of conveying rollers 14. An conveyed object 25 (FIG. 1), which is an object to be conveyed, placed on the conveying passage is conveyed in accordance with rotation of the conveying rollers 14.

As described above, the driving roller contains the motor for driving the rollers and the speed reducer inside. Accordingly, the driving motor for driving the rollers is disposed in the same plane as the plane of respective rotating bodies (rollers) in this embodiment.

Movement of the roller side frame 19 in the horizontal direction is regulated by regulating units 73*a* through 73*d*. Reciprocating movement of the roller side frame 19 is allowed only in the up-down direction. The regulating units 73*a* through 73*d* are further detailed below.

Figure 15:
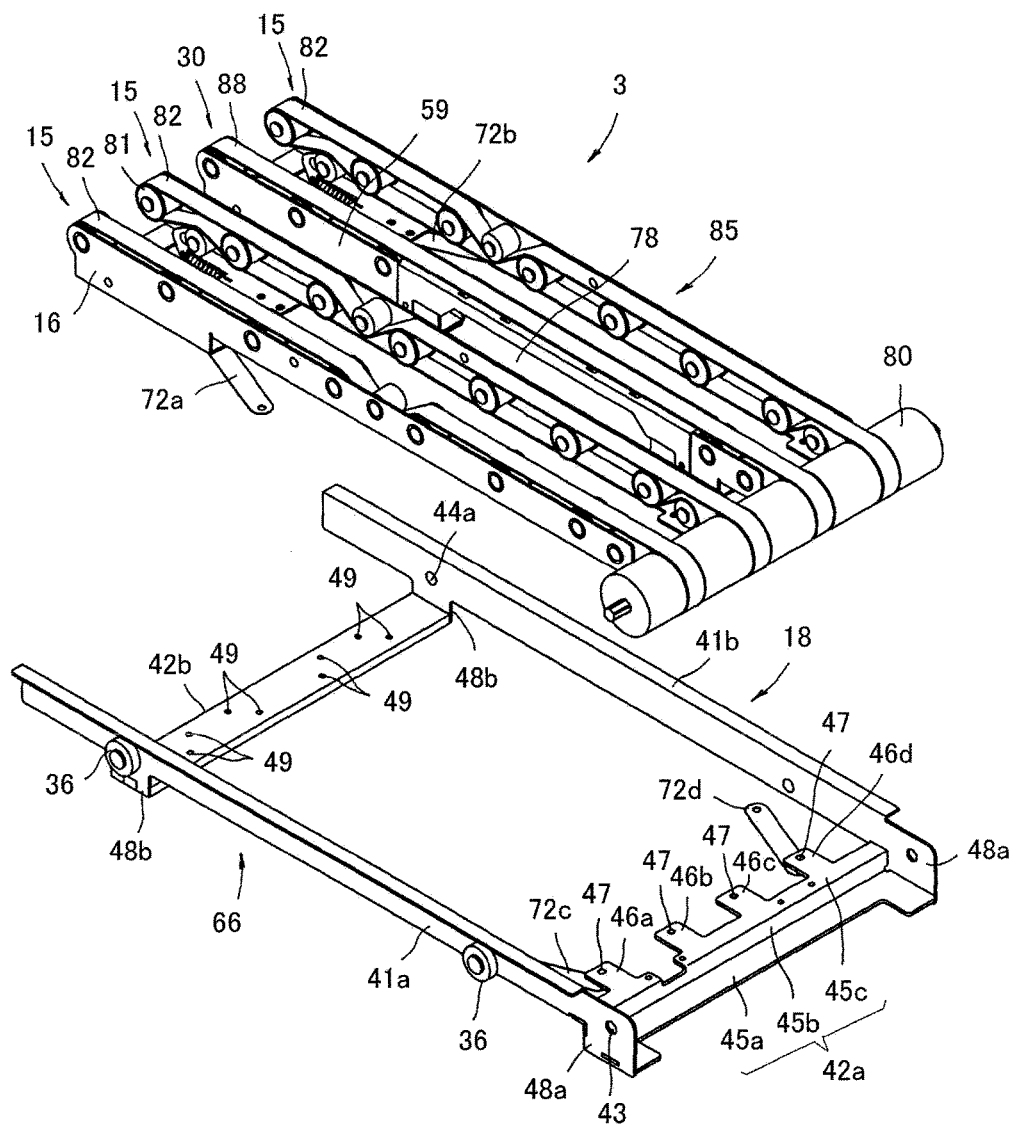
FIG. 15 is an exploded perspective view of the main conveyer unit.

As illustrated in FIGS. 3 and 15, the main conveyer unit 3 includes one belt driving roller 80, a plurality of belt following pulleys 81, annular belts 82 and 88 extending between both the rollers, a belt side frame 18, and a belt conveyer main body 85.

Figure 2:
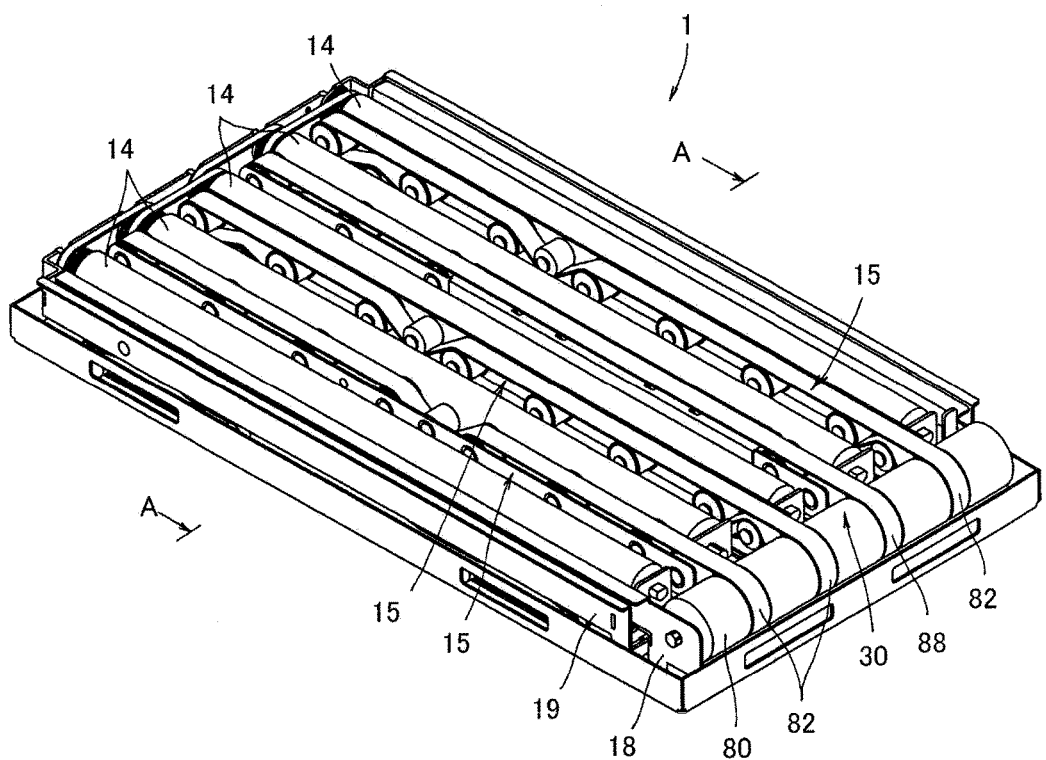
FIG. 2 is a perspective view of the transfer device according to the embodiment of the present invention.

The belt conveyer main body 85 includes three first narrow belt conveyers 15 (narrow conveyers) each of which has a small width, and one second narrow belt conveyer 30 (narrow conveyer) which has a small width. The first narrow belt conveyers 15 and the second narrow belt conveyer 30 are disposed in four parallel lines as illustrated in FIGS. 2, 3, and 15.

Figure 30:
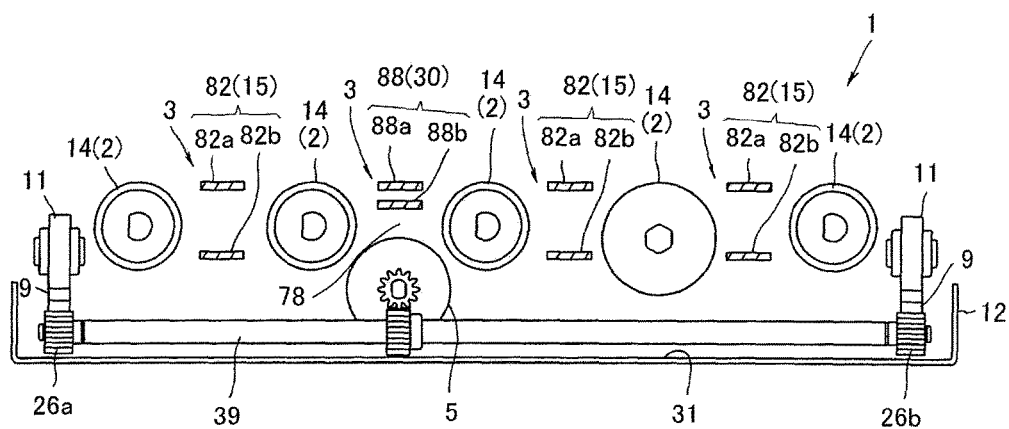
FIG. 30 is a cross-sectional view depicting a concept of a cross section taken along a line A-A in FIG. 2 to explain a positional relationship between the geared motor and conveying rollers and belts.

The belt 82 of each of the first narrow belt conveyers 15 has an annular shape. As illustrated in FIG. 30, each of the belts 82 has a traveling track constituted by a conveying passage side 82a on which the conveyed object 25 (FIG. 1) is placed, and a return side 82b passing below the conveying passage side 82a. Similarly, the belt 88 of the second narrow belt conveyer 30 having an annular shape has a traveling passage constituted by a conveying passage side 88a on which the conveyed object 25 (FIG. 1) is placed, and a return side 88b passing below the conveying passage side 88a.

The conveying passage side 82a and the return side 82b of each of the first narrow belt conveyers 15 extend in parallel substantially for the overall length in the conveying direction of the main conveyer unit 3 for conveying the conveyed object 25. The width of each of the first narrow belt conveyers 15 is substantially uniform in the height direction.

Figure 17:
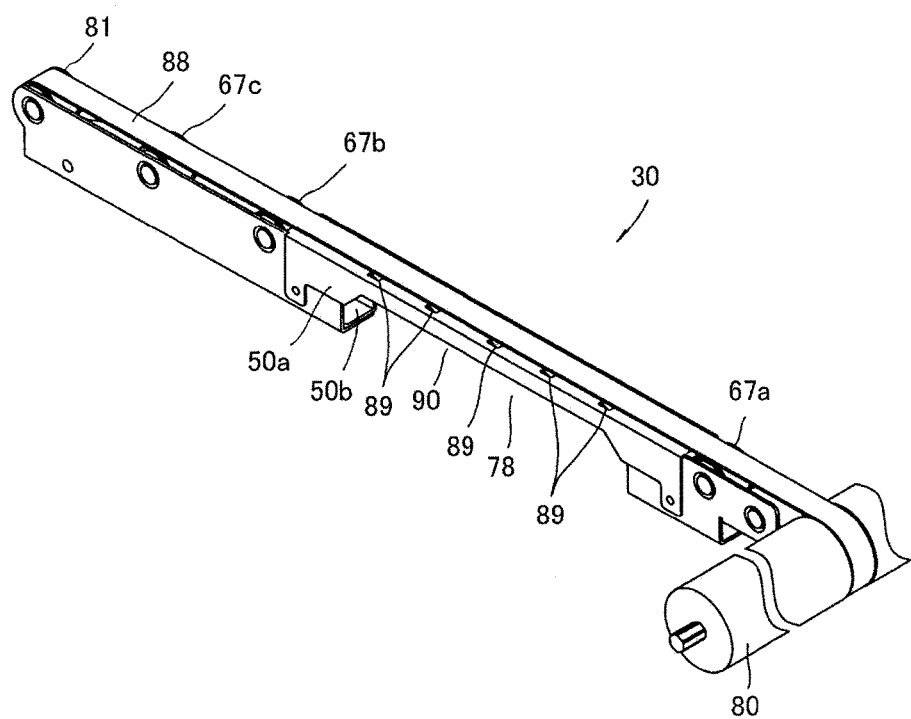
FIG. 17 is a perspective view of a second narrow belt conveyer corresponding to a component of the main conveyer unit.

On the other hand, a narrow part 90 is formed in the vicinity of the center of the second narrow belt conveyer 30 (FIG. 17). The second narrow belt conveyer 30 has a substantially U shape including a recessed lower portion produced by the narrow part 90. The return side 88b of the belt 88 of the second narrow belt conveyer 30 comes close to the conveying passage side 88a in the area of the narrow part 90 for a predetermined length in the conveying direction of the main conveyer unit 3 for conveying the conveyed object 25. Accordingly, the width of the second narrow belt conveyer 30 in the height direction is smaller in the area of the narrow part 90 than in other areas. The lower part in the vicinity of the center of the second narrow belt conveyer 30 is recessed to constitute the narrow part 90. The narrow part 90 is located in the vicinity of the center of the second narrow belt conveyer 30 and extends in the traveling direction of the belt 82.

Figure 20:
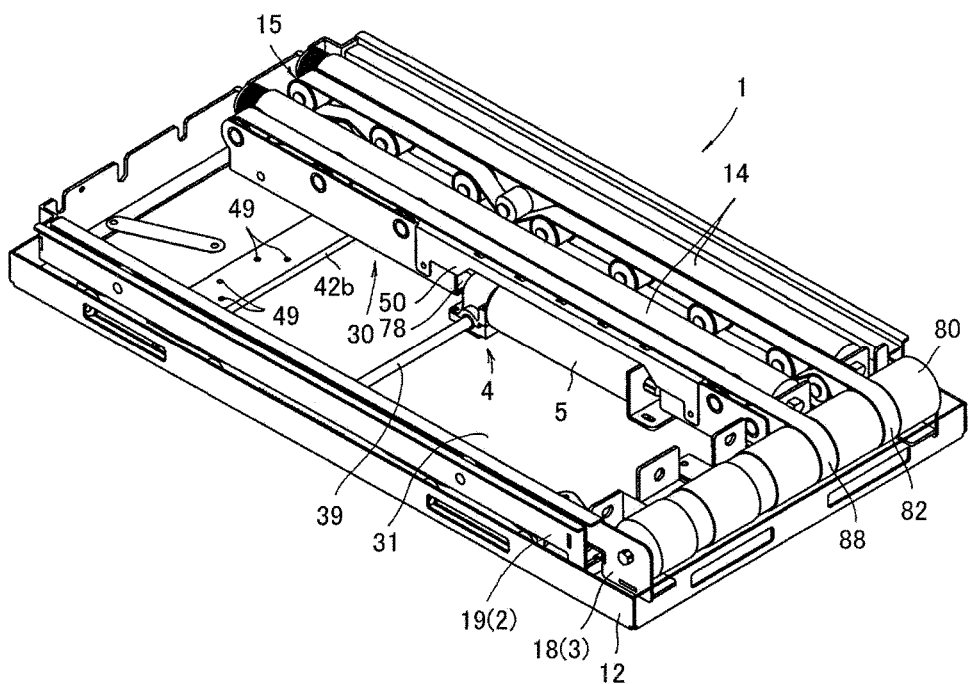
FIG. 20 is a perspective view showing a positional relationship between the second narrow belt conveyers, the conveying rollers, and the geared motor of the transfer device illustrated in FIG. 3.

When the main conveyer unit 3 is positioned in the main frame 12, a space 78 (FIGS. 20, 22C and 30) is produced between the narrow part 90 of the second narrow belt conveyer 30 and a bottom wall 31 of the main frame 12. The space 78 is an area sectioned by the narrow part 90 and the bottom wall 31, and has a larger area in the height direction than that of an area formed between the bottom wall 31 and portions of the second narrow belt conveyer 30 other than the narrow part 90, and a space formed between the bottom wall 31 and each of the first narrow belt conveyers 15.

As illustrated in FIG. 30, the space 78 is formed between the adjoining conveying rollers 14 of the sub conveyer unit 2 within the transfer device 1, and extends in parallel with the conveying rollers 14.

In the plan view, the space 78 and the respective conveying rollers 14 are disposed in parallel with each other. The respective conveying rollers 14 are lifted and lowered on the side of the space 78 by a lifting and lowering mechanism 4. Accordingly, the respective conveying rollers 14 do not enter the space 78.

In the plan view, the second narrow belt conveyer 30 and the respective first narrow belt conveyers 15 are disposed in parallel with each other. The respective first narrow belt conveyers 15 are lifted and lowered on the side of the space 78 by the lifting and lowering mechanism 4. The belt 82 of each of the first narrow belt conveyers 15 travels along the traveling track (conveying passage side 82a and return side 82b) in accordance with the belt driving roller 80. Accordingly, the respective belts 82 do not enter the space 78.

The belt 88 of the second narrow belt conveyer 30 travels on the traveling track (conveying passage side 88a and return side 88b) along the narrow part 90. The belt 88 passes through both the ends of the space 78 in the longitudinal direction and above the space 78 in a U shape, while avoiding passage through the space 78. Accordingly, the belt 88 does not enter the space 78.

The geared motor 5 of the lifting and lowering unit is disposed within the space 78. The geared motor 5 is attached in a posture in parallel with the conveying rollers 14 of the sub conveyer units 2 and between the conveying rollers 14.

The height position of the geared motor 5 disposed in the space 78 is determined such that a part or the whole of the geared motor 5 is located higher than the height of a lower end of a rotational track or traveling track of any one of the conveying bodies (conveying rollers 14 and belts 82 and 88) when any one of the conveying units (main conveyer unit 3 and sub conveyer unit 2) is lowered. Accordingly, the respective heights of the lower ends of the lowered conveying rollers 14, the height of the lower end of the belt 82 of the lowered first narrow belt conveyer 15, and the height of the lower end of the belt 88 of the lowered second narrow belt conveyer 30 are lower than the highest portion of the space 78.

The geared motor 5 is stored in the space 78 formed inside the transfer device 1. In this case, the geared motor 5 does not collide with the main conveyer unit 3 and the sub conveyer unit 2 moving upward and downward.

According to this embodiment, the geared motor 5 and the first narrow belt conveyers 15 of the main conveyer unit 3 do not overlap with each other in the plan view. Accordingly, the belts 82 of the first narrow belts conveyers 15 are lifted and lowered by the lifting and lowering mechanism 4 on the side of the geared motor 5. In this case, the height position of the geared motor 5 exceeds the heights of the lower end portions of the traveling tracks of the belts 82.

Moreover, the height position of the geared motor 5 exceeds the height position of the lower end portion of the traveling track of the belt 88 of the main conveyer unit 3 (second narrow belt conveyer 30). The lower end portion of the traveling track of the belt 88 in this context corresponds to a portion of the return side 88b other than the narrow part 90.

In other words, the belt 88 extending between a short roller 67a, second and third fixing tension pulleys 60b and 60c, and a short roller 67b is provided along the U-shaped narrow part 90 of a short roller attachment member 59. More specifically, the belt 88 is disposed in a position avoiding the geared motor 5 for the entire length of the geared motor 5 in an area from the front end side (output shaft side) portion to the rear end side portion of the geared motor 5 via an area above the geared motor 5.

The planar position of the geared motor 5 resides in a planar area overlapping with the second narrow belt conveyer 30 (conveying unit) of the main conveyer unit 3. However, the space 78 formed between the second narrow belt conveyer 30 and the bottom wall 31 of the main frame 12 accommodates the geared motor 5. The space 78 is formed along the narrow part 90 of the second narrow belt conveyer 30 as described above. In this case, the height position of the geared motor 5 exceeds the height position of the lower end of the return side 88b of the belt 88 (conveying body) passing through the portion of the second narrow belt conveyer 30 other than the narrow part 90 in the lowered state. However, the height position of the geared motor 5 is lower than the height of the narrow part 90 of the second narrow belt conveyer 30 in the lowered state, and therefore does not exceed the height position of the lower end of the return side 88b of the belt 88 (conveying body) passing through the narrow part 90. Accordingly, the geared motor 5 and the belt 88 (conveying body) do not interfere with each other even when the main conveyer unit 3 (second narrow belt conveyer 30) lowers.

Figure 22A:
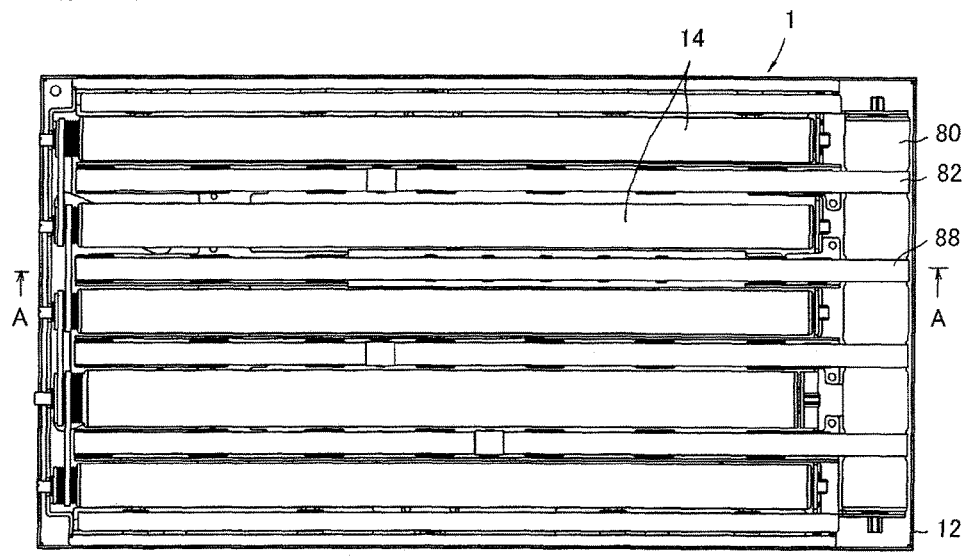

Moreover, the planer position of the geared motor 5 resides in an area overlapping with the sub conveyer unit 2 (conveying unit). In this case, the height position of the geared motor 5 exceeds the height positions of the lower ends of the conveying rollers 14 (conveying bodies) of the sub conveyer unit 2 in the lowered state. The lower ends of the conveying rollers 14 are indicated by a two-dot chain line in FIG. 22C. As illustrated in FIG. 22C, the positions of the conveying rollers 14 and the geared motor 5 overlap with each other in the height direction. However, the position of the geared motor 5 is different from the positions of the respective conveying rollers 14 (conveying bodies) in the plan view, and therefore do not interfere with each other.

Discussed in this embodiment is an example of the belt conveyer main body 85 of the main conveyer unit 3 which includes the three first narrow belt conveyers 15, and the one second narrow belt conveyer 30. However, the second narrow belt conveyer 30 may be eliminated. More specifically, the second narrow belt conveyer 30 may be eliminated to secure a space for accommodating the geared motor 5 of the lifting and lowering mechanism 4 within the transfer device 1.

In addition, discussed herein is an example of the main conveyer unit 3 constituted by a belt conveyer. However, the main conveyer unit 3 may be a short roller conveyer which includes a plurality of short rollers arranged in the conveying direction of an conveyed object for placing the conveyed object thereon.

These techniques allow positioning of the geared motor 5 of the lifting and lowering unit within the space 78 formed inside the transfer device 1 without interference with other parts of the transfer device 1. Accordingly, the overall height of the transfer device 1 decreases.

Other types of motor may be employed in lieu of the geared motor 5. The motor is not limited to the geared motor 5, but may be of any types as long as the motor is rotatable at a low speed, and equipped with an independent speed reducer.

Cam followers 36 are provided at four points of a lower portion of the belt side frame 18 on the outside thereof. Each of the cam followers 36 is constituted by a short roller. The main conveyer unit 3 is a unit which includes the belt side frame 18, and the belt driving roller 80, the plurality of belt following pulleys 81, and the four cam followers 36 combined with the belt side frame 18 into one body.

The belt driving roller 80 is a motor-incorporating roller which includes a motor (not shown) containing a speed reduction mechanism inside a rotatable outer cylinder. Accordingly, the outer cylinder rotates in accordance with driving of the motor.

Movement of the belt side frame 18 in the horizontal direction is regulated by the regulating units 72a through 72d. The belt side frame 18 is only allowed to reciprocate in the up-down direction. The regulating units 72a through 72d are detailed below.

The main conveyer unit 3 includes conveying passages formed by the belts 82. The conveyed object 25 placed on the conveying passages is conveyed in accordance with traveling of the annular belts 82.

The conveying passages of the main conveyer unit 3, and the conveying passages of the sub conveyer unit 2 are disposed in the same planar area as illustrated in FIGS. 1, 2, 23A, 23B, 24A, and 24B. More specifically, the belts 82 of the main conveyer unit 3 are disposed between the conveying rollers 14 of the sub conveyer unit 2 such that the two types of conveyer passages are disposed in the same planar area.

The lifting and lowering unit is hereinafter described. According to this embodiment, the lifting and lowering unit is constituted by the lifting and lowering mechanism 4 including a plurality of parts combined with each other, and the geared motor 5.

More specifically, the lifting and lowering mechanism 4 includes a gear train 52, a power transmission shaft 39, pinion gears 26, horizontal movement members 11, the foregoing cam followers 27 belonging to the sub conveyer unit 2, the foregoing cam followers 36 belonging to the main conveyer unit 3, and others.

The power transmission shaft 39 is disposed in a direction crossing an output shaft of the geared motor 5. The power transmission shaft 39 is located at a skew position with respect to the output shaft of the geared motor 5. More specifically, the height of the power transmission shaft 39 is located below the output shaft (not shown) of the geared motor 5. Both ends of the power transmission shaft 39 come close to the corresponding ends of the transfer device 1. The pinion gears 26 are attached to the corresponding ends of the power transmission shaft 39.

The skew position in this context refers to a positional relationship between two lines not parallel with each other and not crossing each other.

The power transmission shaft 39 is disposed below and slightly apart from the respective conveying rollers 14 of the main conveyer unit 3 and the belts 82 and 88 of the sub conveyer unit 2 within the transfer device 1. The power transmission shaft 39 crosses the respective conveying rollers 14 and the belts 82 and 88 at right angles in the plan view.

Figure 5:
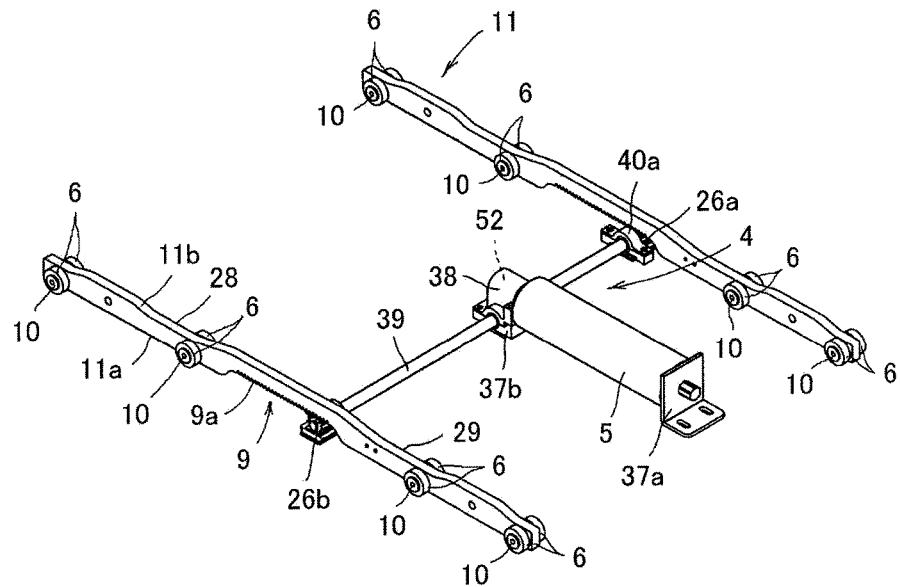
FIG. 5 is a perspective view of a lifting and lowering mechanism and a geared motor of the transfer device illustrated in FIG. 2.

The gear train 52 connects the output shaft of the geared motor 5 and an intermediate portion of the power transmission shaft 39 disposed at skew positions as illustrated in FIG. 5. The gear train 52 transmits rotational force of the geared motor 5 to the power transmission shaft 39. Accordingly, the pinion gears 26 attached to both the ends of the power transmission shaft 39 rotate in accordance with rotation of the geared motor 5.

According to this embodiment, the two horizontal movement members 11 are disposed in parallel between the roller side frame 19 and the belt side frame 18. A rack 9 is formed in the downward direction in each of the horizontal movement members 11. Reciprocation of the horizontal movement members 11 is allowed only in the longitudinal direction.

Each of the foregoing pinion gears 26 engages with the corresponding rack 9 formed in the downward direction.

As described above, the power transmission shaft 39 is disposed in a skew position with respect to the output shaft of the geared motor 5, and below the output shaft (not shown) of the geared motor 5. The pinion gears 26 provided on the power transmission shaft 39 engage with the racks 9 formed in the downward direction. This layout of the transfer device 1 in the embodiment allows positioning the geared motor 5 within a space surrounded by the horizontal movement members 11, thereby succeeding in reducing the overall height of the transfer device 1.

As illustrated in FIG. 5 and FIGS. 6A through 6C, each of the horizontal movement members 11 is constituted by a translation cam which includes a long upper surface 11b. The foregoing rack 9 is provided on the lower side of the center of the upper surface 11b.

Each of the foregoing pinion gears 26 engages with the corresponding rack 9. The horizontal movement members 11 reciprocate in the horizontal direction in accordance with transmission of power from the pinion gears 26 performing regular rotation and reverse rotation. More specifically, the horizontal movement members 11 reciprocate in accordance with transmission of power generated by rotation of the foregoing geared motor 5.

As described above, each of the horizontal movement members 11 is constituted by a translation cam. Cam recesses 28 and 29 are formed in the upper surface 11b. The cam recesses 28 and 29 are formed on one and the other sides of the rack 9, respectively. The foregoing cam followers 27 provided on the roller side frame 19, and the foregoing cam followers 36 provided on the belt side frame 18 engage with the cam recesses 28 and 29.

Figure 7A:
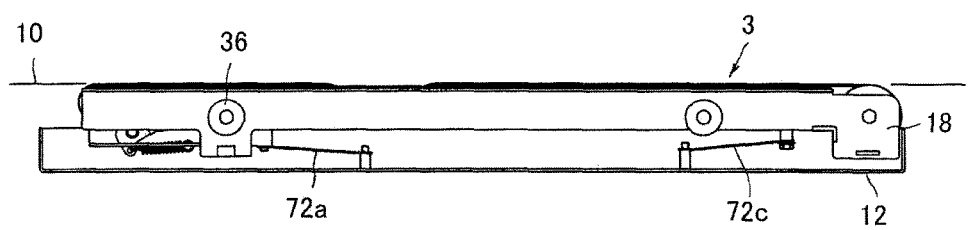
Figure 7B:
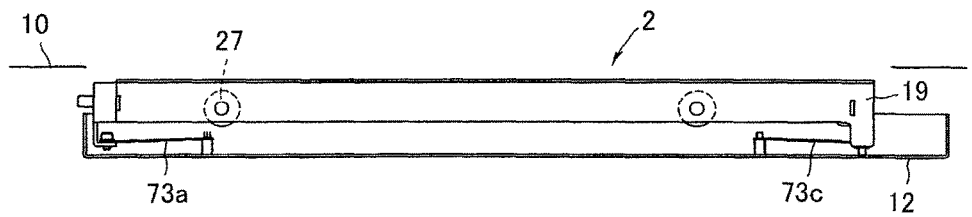
Figure 7C:
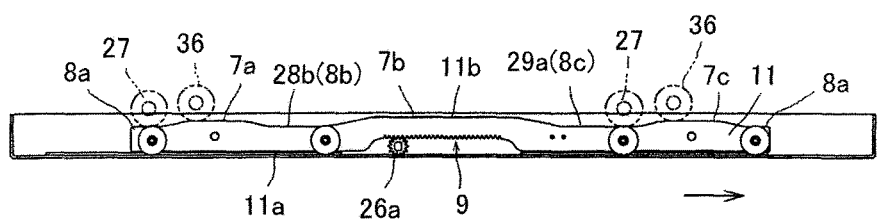

More specifically, when the pinion gears 26 rotate with rotation of the geared motor 5, the upper surface 11b of the horizontal movement member 11 horizontally moves while rotating the cam followers 27. When the cam recesses 28 and 29 reach the positions of the cam followers 27, the cam followers 27 drop inside the cam recesses 28 and 29 as illustrated in FIGS. 7A through 7C. As a result, the roller side frame 19 combined with the cam followers 27 lowers, whereby the sub conveyer unit 2 moves downward. On the other hand, the main conveyer unit 3 remains at the lifted position.

Figure 8A:
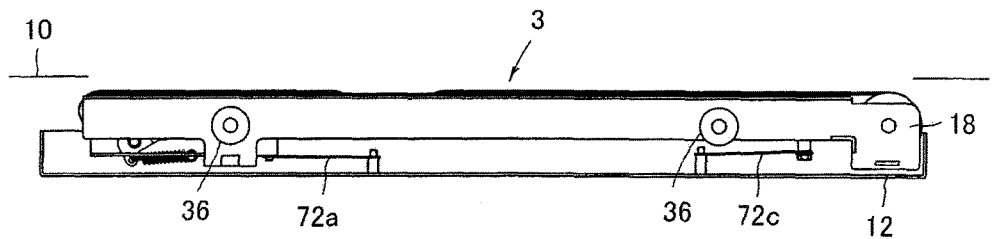
Figure 8B:
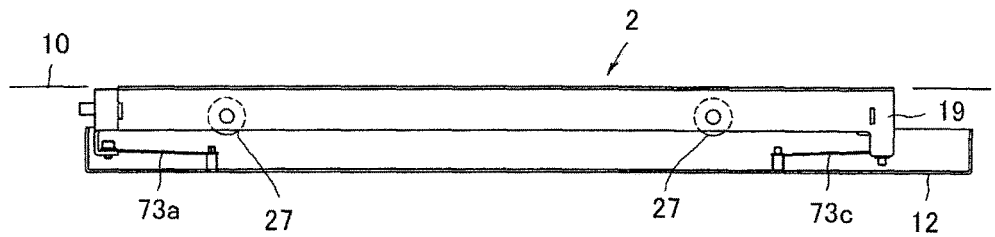
Figure 8C:
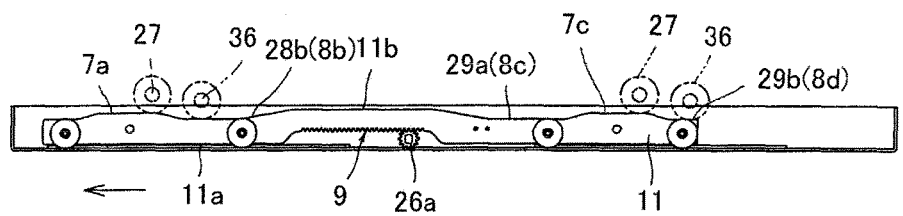

Similarly, the four cam followers 36 of the belt side frame 18 drop into the cam recesses 28 and 29 as illustrated in FIGS. 8A through 8C when the horizontal movement member 11 horizontally moves in accordance with rotation of the geared motor 5 and rotation of the pinion gears 26. As a result, the belt side frame 18 lowers, whereby the main conveyer unit 3 moves downward. On the other hand, the sub conveyer unit 2 remains at the lifted position.

As described above, the pinion gears 26 attached to both the ends of the power transmission shaft 39 rotate in accordance with rotation of the geared motor 5. The rotation of the pinion gears 26 moves the horizontal movement members 11. Accordingly, the rotation of the geared motor 5 allows alternate lifting and lowering of the main conveyer unit 3 and the sub conveyer unit 2.

The main conveyer unit 3 and the sub conveyer unit 2 of the transfer device 1 of this embodiment are combined into one unit, and disposed within the main frame 12.

The main conveyer unit 3 and the main frame 12 are connected only by the four regulating units 72a through 72d.

Similarly, the sub conveyer unit 2 and the main frame 12 are connected only by the four regulating units 73a through 73d.

Figure 9:
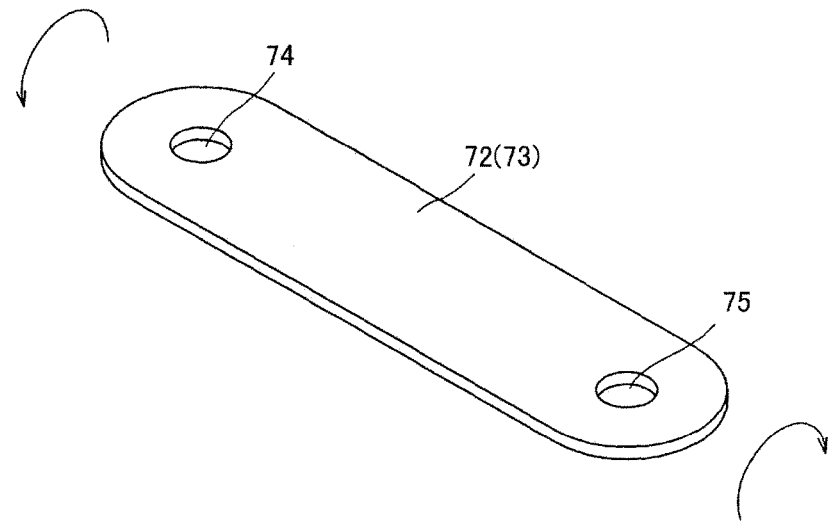
FIG. 9 is a perspective view of a regulating unit incorporated in the transfer device illustrated in FIG. 2.
Figure 10A:
Figure 10B:
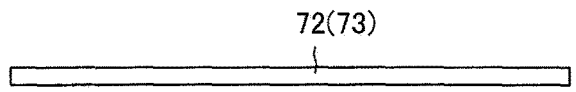
Figure 10C:
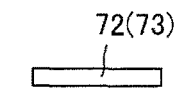
Figure 11A:
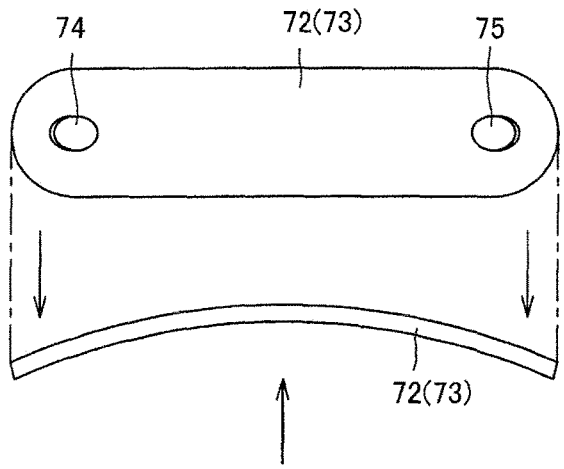
Figure 11C:
Figure 12A:
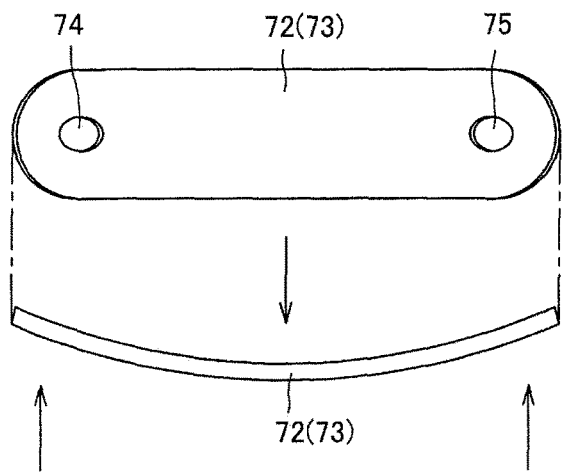
Figure 12C:
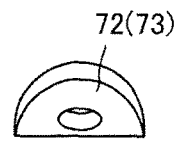

Each of the regulating units 72 and 73 included in the transfer device 1 of this embodiment is a flat spring. Each of the regulating units 72 and 73 is produced by punching a thin plate-shaped spring steel, and is oval-shaped in the plan view as illustrated in FIGS. 10A through 10C. More specifically, each of the regulating units 72 and 73 is constituted by an elliptic thin plate, and has sufficient elasticity to bend in a fixed direction. As illustrated in FIGS. 11A through 11C and FIGS. 12A through 12C, the regulating units 72 and 73 easily bend in the vertical direction with respect to the flat surface. When bending force is applied to the flat surface in the vertical direction as indicated by arrows in FIG. 11B, and in FIG. 12B, the regulating units 72 and 73 easily bend. However, the regulating units 72 and 73 exert high resistance to force applied in a twisting direction as indicated by arrows in FIG. 9, and therefore do not easily become twisted.

Figure 13A:
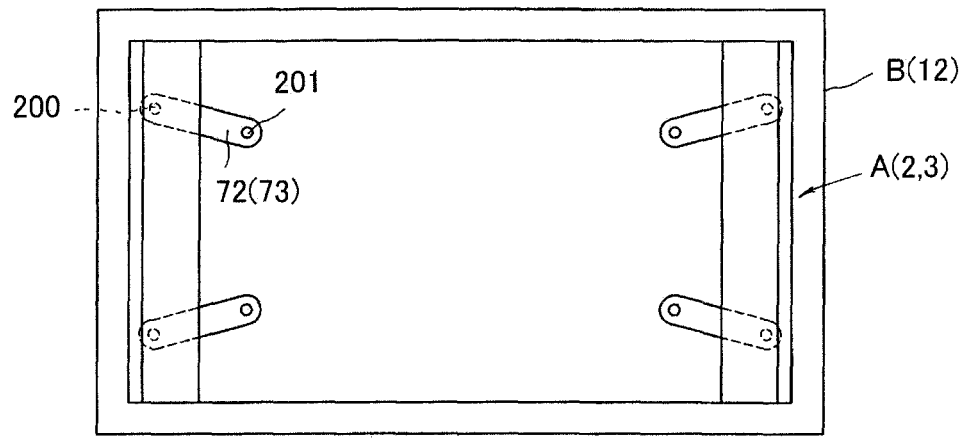
Figure 13B:
Figure 13C:
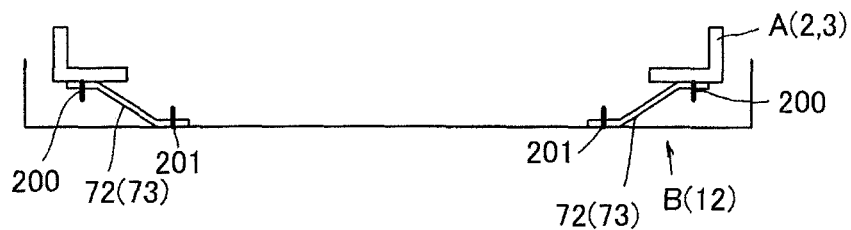
Figure 14A:
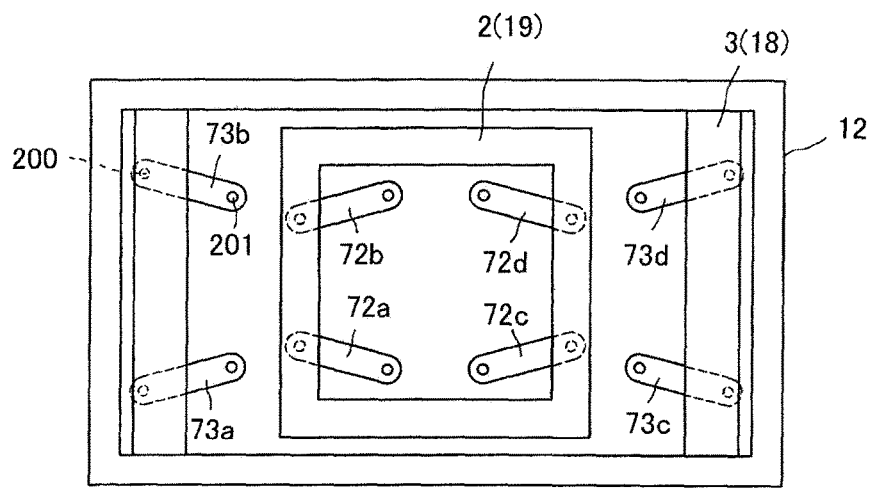
Figure 14B:
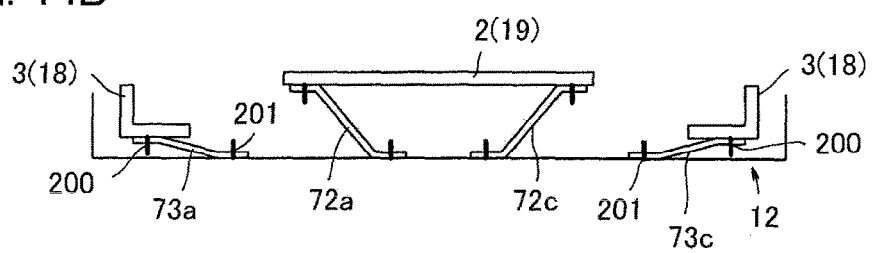
Figure 14C:
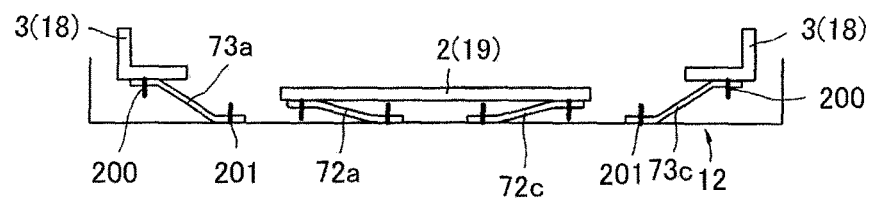

FIGS. 13A through 13C are explanatory views illustrating models of the main conveyer unit 3 or the sub conveyer unit 2, the main frame 12, and the four regulating units 72 or 73 to explain a relationship between these components. In FIG. 13A through 13C, a rectangular frame A is a model of the main conveyer unit 3 or the sub conveyer unit 2. On the other hand, a plane B is a model of the main frame 12.

According to the transfer device 1 of this embodiment, the frame (main conveyer unit 3 or sub conveyer unit 2) and the plane B are connected by the four regulating units 72 or 73. More specifically, one end side of each of the regulating units 72 or 73 is connected to the frame A (main conveyer unit 3 or sub conveyer unit 2), while the other end side of each of the regulating units 72 or 73 is connected to the plane B (main frame 12). Each of the regulating units 72 and 73 is a plate body fixed to the frame A and the plane B only by screwing. This structure facilitates assembly of the transfer device 1.

FIG. 13A illustrates the planar positional relationship between the regulating units 72 or 73. Each of frame A side connection portions 200 of the regulating units 72 or 73 is connected to the frame A, while each of plane B side connection portions 201 of the regulating units 72 or 73 is positioned within a planar area surrounded by the frame A.

As observed in the plan view of the respective regulating units 72 or 73, a center axial line X-X (FIG. 10A) of each of the regulating units 72 or 73 is inclined to each side of the frame A (main conveyer unit 3 or sub conveyer unit 2). In addition, the center axial lines X-X of the respective regulating units 72 or 73 are inclined to each other, and not in parallel with each other.

Furthermore, each of the frame A side connection portions 200 of the regulating units 72 or 73 is disposed in the vicinity of the corresponding corner of the frame A.

The respective regulating units 72 or 73 are disposed in planar postures. The flat surfaces of the respective regulating units 72 or 73 are substantially parallel with a virtual plane of the frame A, and a flat surface constituted by the plane B. More specifically, lower surfaces of the respective regulating units 72 or 73 face a flat surface constituted by the main frame 12 as the plane B, while upper surfaces of the respective regulating units 72 or 73 face the virtual plane of the frame A. Each of the regulating units 72 or 73 is a plate body having elasticity and bending in a fixed direction, and is attached between the plane B (main frame 12) and the frame A in such a posture that the bending direction of the regulating units 72 or 73 is aligned with the lifting and lowering direction of the frame A (main conveyer unit 3 or sub conveyer unit 2).

As described above, each of the regulating units 72 and 73 is a flat spring easily bending in the vertical direction with respect to the flat surface, but does not easily become twisted. The flat surface of each of the regulating units 72 and 73 is substantially parallel with the virtual plane of the frame A and the flat surface constituted by the plane B. Accordingly, when each of the regulating units 72 and 73 is observed, the frame A side connection portion 200 of each of the regulating units 72 and 73 moves in a straight line in the vertical direction with respect to the plane B by bending of the regulating units 72 and 73. More specifically, when the frame A is lifted by the cams, the respective regulating units 72 and 73 bend into a downward convex state to vertically move the frame A without deviation.

According to this embodiment, the plurality of (four) regulating units 72 and the plurality of (four) regulating units 73 are attached between the frame A and the plane B. Accordingly, each of the A side connection portions 200 of the regulating units 72 and 73 moves in a straight line in the vertical direction with respect to the plane B.

In this structure, the four regulating units 72 and the four regulating units 73 are attached between the frame A and the plane B. Each of the frame A side connection portions 200 of the regulating units 72 and 73 is located close to the corresponding corner of the frame A. In addition, each of the regulating units 72 and 73 has properties not easily twisted. In this case, large force is not required for moving the frame A and the plane B close to and away from each other in parallel. Furthermore, reaction force generated between the regulating units 72 and 73 corrects the positions of the frame A and the plane B into parallel postures when the positions of the frame A and the plane B come into inclined positions or twisted positions.

According to this embodiment, therefore, the respective regulating units 72 and 73 regulate the frame A such that the frame A moves upward and downward in a straight line with respect to the plane B. More specifically, the main conveyer unit 3 and the main frame 12 according to this embodiment are connected to each other only by the four regulating units 72. This structure regulates the main conveyer unit 3 such that the main conveyer unit 3 moves in a straight line in the vertical direction with respect to the main frame 12 by operation of the four regulating units 72. More specifically, the regulating units 72 regulate movement of the belt side frame 18 of the main conveyer unit 3 in the horizontal direction. Only reciprocation of the belt side frame 18 in the up-down direction is allowed in this condition.

This configuration is applicable to the relationship between the sub conveyer unit 2 and the main frame 12. The sub conveyer unit 2 and the main frame 12 are connected to each other only by the four regulating units 73. This structure regulates the sub conveyer unit 2 such that the sub conveyer unit 2 moves in a straight line in the vertical direction with respect to the main frame 12 by operation of the four regulating units 73. More specifically, the regulating units 73 regulate movement of the roller side frame 19 of the sub conveyer unit 2 in the horizontal direction. Only reciprocation of the roller side frame 19 in the up-down direction is allowed in this condition.

As described above, each of the main conveyer unit 3 and the sub conveyer unit 2 includes the four cam followers 36 or the four cam followers 27. The four cam followers 36 and the four cam followers 27 are simultaneously lifted and lowered by the horizontal movement members 11 corresponding to the translation cams. Accordingly, the four cam followers 36 of the main conveyer unit 3 are simultaneously lifted and lowered by the horizontal movement members 11, allowing the main conveyer unit 3 to move upward and downward while maintaining a horizontal posture.

This configuration is applicable to the sub conveyer unit 2. The four cam followers 27 of the sub conveyer unit 2 are simultaneously lifted and lowered by the horizontal movement members 11, allowing the sub conveyer unit 2 to move upward and downward while maintaining a horizontal posture.

Each of the regulating units 72 and 73 is constituted by a flat spring which is extremely thin, and disposed in parallel with the virtual plane of the main conveyer unit 3 and the virtual plane of the sub conveyer unit 2. Accordingly, each of the respective regulating units 72 and 73 has a planar posture and an extremely small overall height. More specifically, the height of each of the regulating units 72 and 73 is only produced by the thickness of the flat spring, and therefore is considerably smaller than a guide of the conventional technology. Accordingly, the overall height of the transfer device 1 of this embodiment decreases.

FIGS. 13A through 13C illustrate the frame A as a model of the main conveyer unit 3 or the sub conveyer unit 2, and the plane B as a model of the main frame 12 for describing the function of the regulating units 72 and 73. In an actual situation of the transfer device 1 of this embodiment, the belt side frame 18 corresponding to a part of the main conveyer unit 3 is smaller than the roller side frame 19 corresponding to a part of the sub conveyer unit 2 as illustrated in FIG. 2, and is contained within the roller side frame 19. Accordingly, both the frames 18 and 19 are disposed in a common area in the height direction.

The four regulating units 72a through 72d illustrated in FIG. 15 are attached between the belt side frame 18 and the main frame 12 to guide the belt side frame 18 in the vertical direction. In addition, the four regulating units 73a through 73d illustrated in FIG. 21 are attached between the roller side frame 19 and the main frame 12 to guide the roller side frame 19 in the vertical direction.

A specific configuration of the transfer device 1 according to this embodiment is hereinafter described in more detail.

As illustrated in FIG. 1, the transfer device 1 of this embodiment is disposed at a crossing position of the conveying passages of the conveyer line 21. More specifically, the transfer device 1 is disposed between an upstream side main conveying line 22 and a downstream side main conveying line 23 disposed in a line to constitute a main line 100. A sub conveying line 24 crossing the main conveying lines 22 and 23 at right angles is connected to the transfer device 1.

According to this structure, the conveyer line 21 conveys the conveyed object 25 along the main line 100 (main conveying lines 22 and 23), or changes the conveying direction on the transfer device 1 to convey the conveyed object 25 along a sub line 101 (sub conveying line 24).

As illustrated in FIG. 3, the transfer device 1 includes the main frame 12 which stores and positions all of the components, the main conveyer unit 3 which conveys the conveyed object 25 (FIG. 1) toward the main conveying line 23 (FIG. 1), and the sub conveyer unit 2 which conveys the conveyed object 25 toward the sub line 101. The transfer device 1 further includes the lifting and lowering mechanism 4 as illustrated in FIG. 3.

The main frame 12 includes the bottom wall 31, long side walls 32a and 32b, and short side walls 33a and 33b.

The bottom wall 31 has a rectangular thin plate shape. The long side walls 32a and 32b are provided on the long end sides of the bottom wall 31. The short side walls 33a and 33b are provided on the short end sides of the bottom wall 31. The long side walls 32a and 32b, and short side walls 33a and 33b are connected to each other to constitute a frame surrounding all directions. The long side walls 32a and 32b, and the short side walls 33a and 33b are fixed to the bottom wall 31 at right angles.

Four guide members 68 extending from the end side to the center side of the long side walls 32a and 32b are provided on the bottom wall 31 along the long side walls 32a and 32b. Each of the guide members 68 is constituted by a bottom board 68a, a guide rail 68b, and screws 68c.

The bottom board 68a is a substantially rectangular thin plate component. The guide rail 68b is a plate-shaped component which has a length equivalent to the length of the bottom board 68a, and a width smaller than the width of the bottom board 68a. The guide rail 68b is disposed at the center of the bottom board 68a. Ends of each of the components 68a and 68b are fixed to the bottom wall 31 by the screws 68c penetrating the components 68a and 68b. The upper part of the bottom board 68a on both sides of the guide rail 68b constitutes a rail 69.

The bottom wall 31 includes four cylindrical fixing portions 34a through 34d, and four cylindrical fixing portions 35a through 35d. A female screw is formed inside each of the cylindrical fixing portions. Only the cylindrical fixing portions 35c and 35d are longer than the others of the eight cylindrical portions.

One end of each of the regulating units 73a through 73d is fixed to the corresponding one of the four cylindrical fixing portions 34a through 34d of the main frame 12. The other ends of the regulating units 73a through 73d are connected to the roller side frame 19 of the sub conveyer unit 2.

One end of each of the regulating units 72a through 72d is fixed to the corresponding one of the four cylindrical fixing portions 35a through 35d of the main frame 12. The other ends of the regulating units 72a through 72d are connected to the belt side frame 18 of the main conveyer unit 3.

Figure 6A:
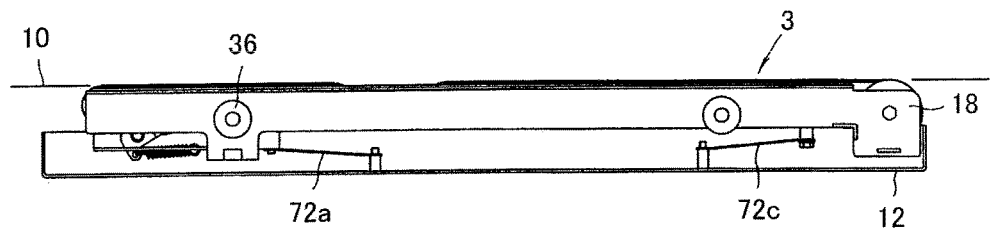
Figure 6B:
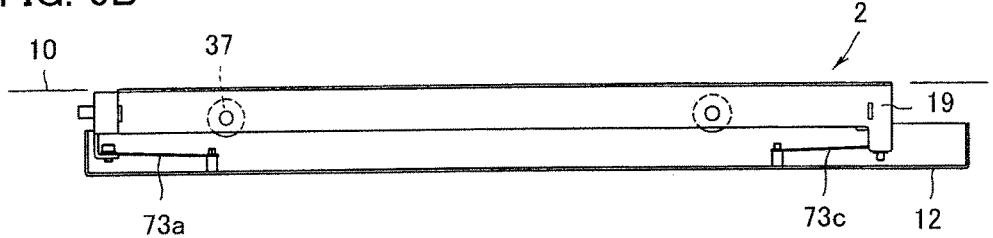
Figure 6C:
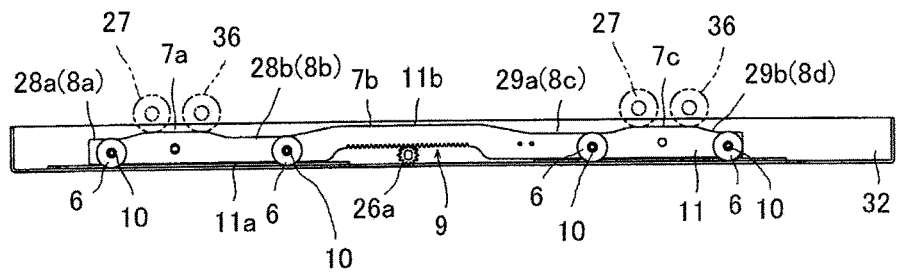

Accordingly, the respective cylindrical fixing portions 34a through 34d and 35a through 35d are joined to the belt side frame 18 and the roller side frame 19 (described below) via the regulating units 72a through 72d and 73a through 73d as illustrated in FIGS. 6A through 6C.

The lifting and lowering mechanism 4 is provided on the bottom wall 31.

As illustrated in FIG. 5, the lifting and lowering mechanism 4 includes the geared motor 5, the power transmission shaft 39, the horizontal movement members 11, and others.

A helical gear (not shown) is attached to the output shaft (not shown) of the geared motor 5. The geared motor 5 is fixed to the central portion of the bottom wall 31 via fixing members 37a and 37b in such a posture that the output shaft (not shown) faces in the longitudinal direction of the main frame 12. A gear box 38 is fixed to the fixing member 37b. The output shaft (not shown) of the geared motor 5 is stored in the gear box 38.

The power transmission shaft 39 has a length slightly smaller than the length of the bottom wall 31 in the transverse direction. A helical gear (not shown) different from the helical gear (not shown) provided on the geared motor 5 is equipped at an intermediate position of the power transmission shaft 39. Pinion gears 26a and 26b are provided at one and the other end of the power transmission shaft 39, respectively.

The power transmission shaft 39 extends in the transverse direction of the main frame 12, and resides at the center of the bottom wall 31. Portions around both the ends of the power transmission shaft 39 are supported by bearing members 40a and 40b. The pinion gear 26a is disposed between the two guide members 68 extending along the long side wall 32a. The pinion gear 26b is disposed between the two guide members 68 extending along the long side wall 32b.

The power transmission shaft 39 penetrates the gear box 38 in the direction crossing the output shaft (not shown) of the geared motor 5 at right angles. The not-shown helical gear of the power transmission shaft 39 is stored in the gear box 38. The helical gear (not shown) on the geared motor 5 side and the helical gear (not shown) on the power transmission shaft 39 side directly or indirectly engage with each other within the gear box 38 to allow power transmission therebetween.

The power transmission shaft 39 is located below the output shaft (not shown) of the geared motor 5. The power transmission shaft 39 and the not-shown output shaft of the geared motor 5 are located in a skew positional relationship.

As illustrated in FIGS. 3, 5, and 6A through 6C, each of the horizontal movement members 11 is a long and substantially rectangular parallelepiped component. The transverse cross section of each of the horizontal movement members 11 is substantially rectangular. Each of the horizontal movement members 11 is disposed within the main frame 12 in such a posture that the longitudinal direction of the rectangular shape of the transverse cross section of the horizontal movement member 11 coincides with the up-down direction. A recess is formed at the central portion of a lower surface 11a of each of the horizontal movement members 11. The rack 9 is provided in this recess. Rack teeth 9a are formed in the rack 9 by an appropriate method such as gear cutting. The rack teeth 9a of the rack 9 are formed in the downward direction.

Four shafts 10 penetrate the side surface of each of the horizontal movement members 11. Each of the four shafts 10 is provided at corresponding one of four points of the horizontal movement member 11 in the longitudinal direction. Two each of the shafts 10 are disposed on one and the other sides of the rack 9, respectively. A pair of guide short rollers 6 are attached to each of the shafts 10.

As illustrated in FIGS. 6A through 6C, 7A through 7C, and 8A through 8C, the upper surface 11b of each of the horizontal movement members 11 has a plurality of portions having different heights. More specifically, the upper surface 11b of each of the horizontal movement members 11 includes a first low portion 8a (cam recess 28a), a first high portion 7a, a second low portion 8b (cam recess 28b), a second high portion 7b, a third low portion 8c (cam recess 29a), a third high portion 7c, and a fourth low portion 8d (cam recess 29b) in this order from one end. The first low portion 8a and the fourth low portion 8d are disposed at one and the other end of the horizontal movement member 11, respectively.

The second high portion 7b is disposed at the central portion of the horizontal movement member 11 in the longitudinal direction, and constitutes the highest portion of the upper surface 11b. In this case, the second high portion 7b is formed in the upper surface 11b at the central portion of the horizontal movement member 11 in the longitudinal direction, while the rack 9 is formed in the lower surface 11a below the second high portion 7b.

As illustrated in FIG. 4, the guide short rollers 6 are disposed on the rail 69 of the bottom board 68a of each of the guide members 68. In this case, the pair of guide short rollers 6 provided on one and the other sides of the guide rail 68b, respectively, are allowed to reciprocate along the guide rail 68b.

The rack teeth 9a (FIG. 5) of the rack 9 engage with the pinion gears 26a and 26b fixed to the power transmission shaft 39. Accordingly, the horizontal movement members 11 move in the longitudinal direction of the main frame 12 when the geared motor 5 is driven.

FIG. 6C illustrates a state of engagement between the pinion gear 26a (26b) and the central portion of the rack 9 of the horizontal movement member 11. When the pinion gear 26a rotates counterclockwise as viewed in FIG. 6C, the horizontal movement member 11 moves leftward as illustrated in FIG. 8C. When the pinion gear 26a rotates clockwise as viewed in FIG. 6C, the horizontal movement member 11 moves rightward as illustrated in FIG. 7C.

As illustrated in FIG. 15, the main conveyer unit 3 includes the belt side frame 18 and the belt conveyer main body 85.

The belt conveyer main body 85 includes the three first narrow belt conveyers 15 (narrow conveyers) each of which has a small width, and the one second narrow belt conveyer 30 (narrow conveyer) which has a small width. The respective belt conveyers 15 and 30 are disposed in four lines in parallel with each other. The one belt driving roller 80 is provided as a common driving pulley of the four lines of the narrow belt conveyers. Accordingly, the one belt driving roller 80 (motor-incorporating roller) is provided as a common driving pulley in this embodiment.

Figure 16:
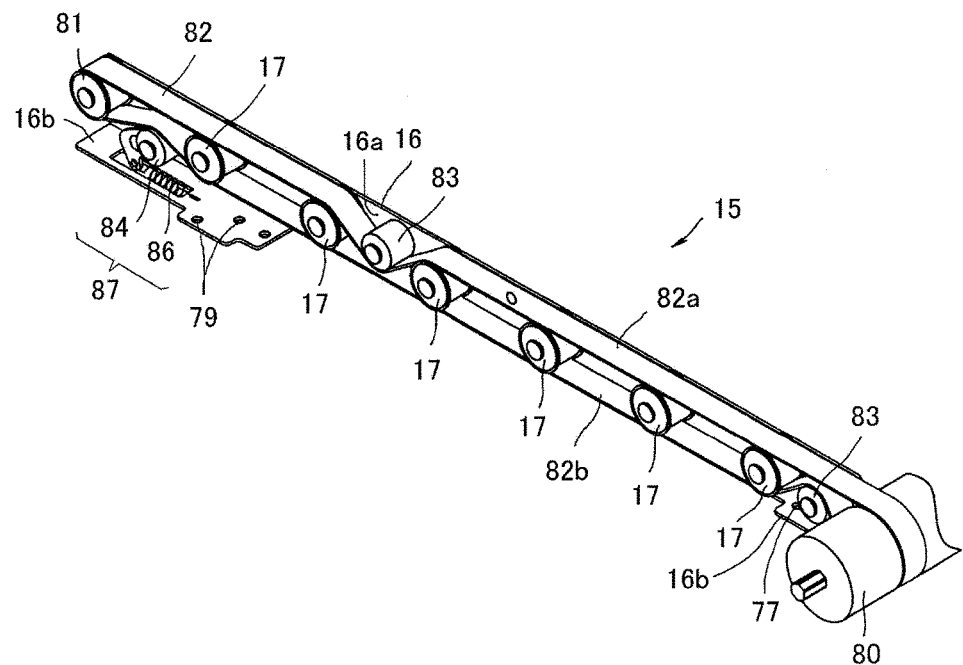
FIG. 16 is a perspective view of a first narrow belt conveyer corresponding to a component of the main conveyer unit.

Each of the first narrow belt conveyers 15 has a configuration illustrated in FIG. 16. A plate-shaped short roller attachment member 16 is provided on one side of the first narrow belt conveyer 15. One belt following pulley 81, two fixing tension pulleys 83, and a plurality of short rollers 17 are provided on the short roller attachment member 16.

The belt 82 having a small width extends between the common driving side pulley (belt driving roller 80) and each of the following pulleys.

The respective short rollers 17 are disposed within the annular belt 82 to support a load applied to the belt 82. More specifically, the belt driving roller 80 is arranged in the horizontal direction in the same line as the belt following pulley 81, and the plurality of short rollers 17 fixed to the short roller attachment member 16. Accordingly, the overall height of the main conveyer unit 3 decreases. The fixing tension pulleys 83 press the belt 82 from the outside. The short roller attachment member 16 is a narrow and long plate-shaped component bended in the longitudinal direction into an L shape.

Moreover, according to this embodiment, an auto-tensioner 87 is attached to the belt 82. As illustrated in FIG. 16, the auto-tensioner 87 is attached to the short roller attachment member 16. The auto-tensioner 87 includes a swinging piece 94, a movable tension pulley 84, and a spring 86.

The short roller attachment member 16 includes a long-hole-shaped spring storage hole, and a spring fixing hole. The spring fixing hole is formed at one end of the spring storage hole in the longitudinal direction. One end of the spring 86 is fixed to the spring fixing hole of the short roller attachment member 16. A part of the spring 86 is stored in the spring storage hole.

The swinging piece 94 is rotatably fixed to the short roller attachment member 16 via a shaft. The movable tension pulley 84 is provided at the tip of the swinging piece 94. The movable tension pulley 84 is freely rotatable relative to the swinging piece 94. The other end of the spring 86 is fixed to a rear end portion of the swinging piece 94.

More specifically, the spring 86 connects a spring fixing hole 92b of the short roller attachment member 16 and the rear end portion of the swinging piece 94. A part of the spring 86 is disposed within a spring storage hole 92a. The spring 86 is constituted by a tension spring which pulls the swinging piece 94. The spring 86 gives rotational force to the swinging piece 94 around a shaft 93. When the swinging piece 94 rotates (swings), the movable tension pulley 84 fixed to the tip of the swinging piece 94 presses the belt 82. As a result, appropriate tension is applied to the belt 82.

Accordingly, the auto-tensioner 87 is a component which includes the movable tension pulley 84 freely rotatable and capable of moving close to and away from the belt 82.

The short side wall 42b and the short roller attachment member 16 are fixed to each other by screwing. Similarly, the short side wall 42a and the short roller attachment member 16 (first narrow belt conveyer 15) are fixed to each other by screwing.

Figure 18:
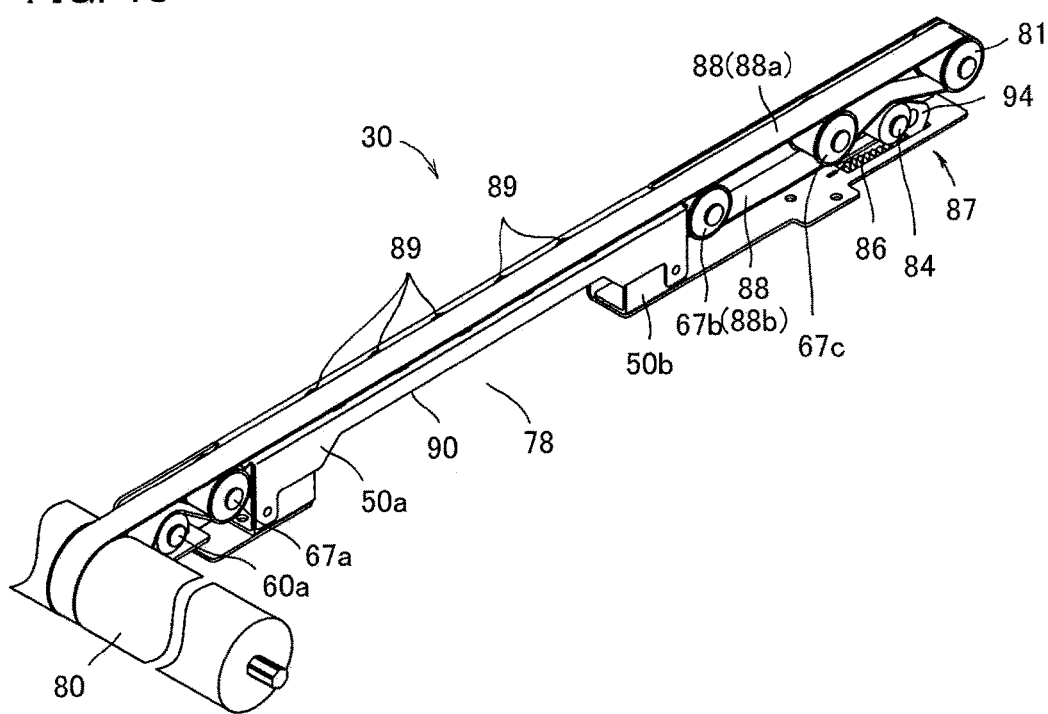
FIG. 18 is a perspective view of the second narrow belt conveyer illustrated in FIG. 17 as viewed at a different angle.
Figure 19:
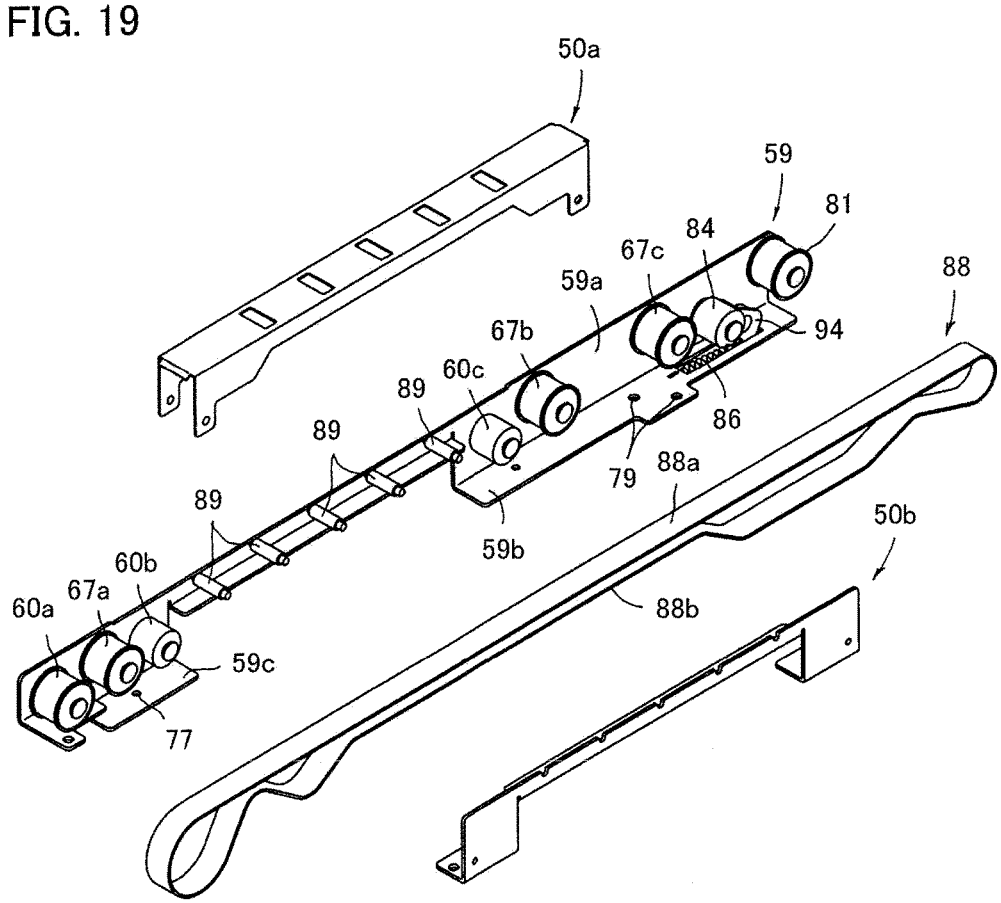
FIG. 19 is an exploded perspective view of the second narrow belt conveyer illustrated in FIG. 18.

The second narrow belt conveyer 30 has a configuration illustrated in FIGS. 17 through 19. A plate-shaped short roller attachment member 59 is provide on one side of the second narrow belt conveyer 30. The short roller attachment member 59 includes one belt following pulley 81, three fixing tension pulleys 60 (first fixing tension pulley 60a, second fixing tension pulley 60b, and third fixing tension pulley 60c), a plurality of short rollers 67 (67a through 67c), and a plurality of small-diameter short rollers 89. The short roller attachment member 59 includes the belt following pulley 81, the three fixing tension pulleys 60, the plurality of short rollers 67, and the plurality of small-diameter short rollers 89 such that these components 81, 60, 67, and 89 are rotatable.

The three fixing tension pulleys 60 (60a through 60c), the plurality of short rollers 67 (67a through 67c), and the plurality of small-diameter short rollers 89 are disposed between the common driving side pulley (belt driving roller 80) and the belt following pulley 81. The belt 88 having a small width extends between the common driving pulley and the belt following pulley 81. The short rollers 67a through 67c and the plurality of small-diameter short rollers 89 are disposed within the belt 88 to support a load applied to the belt 88. The respective fixing tension pulleys 60a through 60c press the belt 88 from the outside to give tension to the belt 88.

The narrow part 90 having a small length in the height direction is formed in the short roller attachment member 59. The narrow part 90 is disposed in the vicinity of the center of the lower portion of the second narrow belt conveyer 30. The narrow part 90 thus formed produces a U-shape of the second narrow belt conveyer 30. The plurality of small-diameter short rollers 89 are disposed along the narrow part 90.

As illustrated in FIG. 18, the annular belt 88 passes through the upper conveying passage side 88a and the lower return side 88b both constituting the traveling track. The conveyed object 25 (FIG. 1) is placed on the belt 88 passing through the conveying passage side 88a, where a load is applied to the belt 88. The respective short rollers 67 (67a through 67c), and the small-diameter short rollers 89 support the load of the conveyed object 25.

A specific layout of the respective components of the second narrow belt conveyer 30 is hereinafter described.

The belt driving roller 80 and the belt following pulley 81 are disposed on one and the other side, respectively. The short roller 67a, the plurality of small-diameter short rollers 89, and the short rollers 67b and 67c are disposed within the belt 88 in this order from the belt driving roller 80 side.

The first fixing tension pulley 60a for pressing the belt 88 from the outside is disposed between the belt driving roller 80 and the short roller 67a.

The second fixing tension pulley 60b is disposed between the short roller 67a and the small-diameter short rollers 89. The third fixing tension pulley 60c is disposed between the small-diameter short rollers 89 and the short roller 67b. Accordingly, the second and third fixing tension pulleys 60b and 60c are disposed on one and the other sides of the plurality of small-diameter short rollers 89, respectively. When the belt 88 is pressed by the second and third fixing tension pulleys 60b and 60c as illustrated in FIG. 17, the belt 88 is lifted along the narrow part 90 of the short roller attachment member 59. As a result, a part of the return side 88*b* (lower side) of the traveling track of the belt 88 comes close to the conveying passage side 88*a* (upper side). The portion of the belt 88 where the conveying passage side 88*a* and the return side 88*b* come close to each other is protected by an upper cover 50*a* and a lower cover 50*b*. The space 78 is formed below the upper cover 50*a* and the lower cover 50*b*.

The auto tensioner 87 is further attached to the second narrow belt conveyer 30. The auto tensioner 87 has a structure identical to the structure of the auto tensioner 87 of the first narrow belt conveyer 15, and therefore is not repeatedly explained herein.

The second narrow belt conveyer 30 is fixed to the belt side frame 18 by screwing similarly to the first narrow belt conveyers 15.

As illustrated in FIGS. 4 and 15, the belt side frame 18 is a frame-shaped component constituted by two long side walls 41*a* and 41*b*, and two short side walls 42*a* and 42*b*. The long side walls 41*a* and 41*b* have the same structure except for differences produced by the left hand wall and the right hand wall. Chiefly discussed hereinbelow is the long side wall 41*a*, and the same explanation concerning the long side wall 41*b* is not repeated.

The long side wall 41*a* is a long flat component, and has a flange shape with the upper side bended at right angles. A protrusion 48*a* protruding downward is provided at one end of the long side wall 41*a*. A protrusion 48*b* protruding downward is provided in the vicinity of the end opposite to the end on which the protrusion 48*a* of the long side wall 41*a* is provided. Protrusion lengths of the protrusions 48*a* and 48*b* are substantially equivalent. A roller fixing hole 43 is formed in the vicinity of the protrusion 48*a* of the long side wall 41*a*.

Follower fixing holes 44*a* (depicted in long side wall 41*b*) are formed at two points of the long side wall 41*a*. The follower fixing holes 44*a* are holes provided for supporting the cam followers 36 such that the cam followers 36 are rotatable. The two cam followers 36 are disposed with a predetermined distance left between each other in the longitudinal direction of the long side wall 41*a*. Both the cam followers 36 are disposed on the outside of the long side wall 41*a*. One of the cam followers 36 is provided at the portion from which the protrusion 48*b* protrudes.

Figure 25:
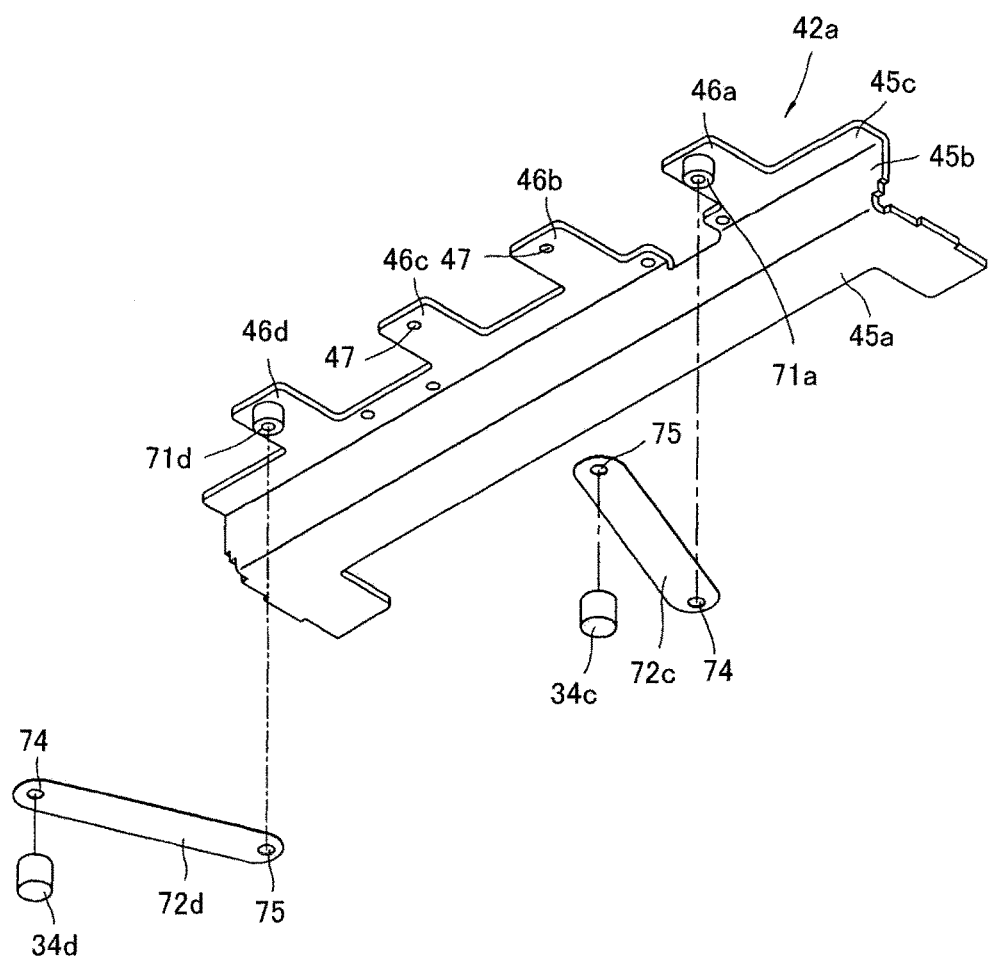
FIG. 25 is a perspective view of one short side wall of a belt side frame of the main conveyer unit as viewed from the rear surface side.

As illustrated in FIGS. 4 and 15, each of the short side walls 42*a* and 42*b* is a flat component shorter than the long side wall 41*a*. As illustrated in FIGS. 15 and 25, respective portions of the short side wall 42*a* are bended to produce a lower horizontal portion 45*a*, a vertical portion 45*b*, and an upper horizontal portion 45*c*.

The lower horizontal portion 45*a* and the upper horizontal portion 45*c* are disposed on the sides opposite to each other with the vertical portion 45*b* interposed between the respective portions 45*a* and 45*c*. Four protrusions 46*a* and 46*d* are formed in the upper horizontal portion 45*c*. The respective protrusions 46*a* through 46*d* are disposed in the same plane as the plane of the upper horizontal portion 45*c*, and protrude to the side opposite to the vertical portion 45*b*.

The respective protrusions 46*a* through 46*d* are sequentially disposed at equal intervals from the end of the upper horizontal portion 45*c*. A hole 47 is formed in the vicinity of each end of the respective protrusions 46*a* through 46*d* on the free end side.

As illustrated in FIG. 25, cylindrical fixing portions 70*c* and 70*d* are provided on the lower surface sides of the protrusions 46*a* and 46*d*, respectively. The cylindrical fixing portions 70*c* and 70*d* are fixed to the protrusions 46*a* and 46*d* by screws penetrating the holes 47. A female screw is formed in each inside of the cylindrical fixing portions 70*c* and 70*d*. One end of the regulating unit 72*c* is fixed to the cylindrical fixing portion 70*c*, while one end of the regulating unit 72*d* is fixed to the cylindrical fixing portion 70*d*.

One and the other ends of the short side wall 42*a* are connected to the tips of the protrusions 48*a* of the long side walls 41*a* and 41*b*, respectively. The respective protrusions 46*a* through 46*d* of the short side wall 42*a* are so disposed as to face the center of the long side walls 41*a* and 41*b*. The lower horizontal portion 45*a* is disposed on the end side of the long side walls 41*a* and 41*b*.

The short side wall 42*b* is a narrow and long plate component having the same length as the length of the short side wall 42*a*. The first narrow belt conveyers 15 and the second narrow belt conveyer 30 are fixed by screwing along the long side of the short side wall 42*b*.

The frame-shaped belt side frame 18 is constituted by the long side walls 41*a* and 41*b* and the short side walls 42*a* and 42*b* having the foregoing structures. Both ends of the short side wall 42*a* (lower horizontal portion 45*a*) are fixed to the protrusions 48*a* of the long side walls 41*a* and 41*b*, while both ends of the short side wall 42*b* are fixed to the tip portions of the protrusions 48*b* protruding downward from the long side walls 41*a* and 41*b*. Accordingly, a space 66*a* is formed below the long side walls 41*a* and 41*b*.

As illustrated in FIGS. 3 and 15, the cam followers 36 are disposed on the outside of the frame of the belt side frame 18.

As illustrated in FIG. 21, the sub conveyer unit 2 includes the roller side frame 19 and a roller conveyer main body 13. The roller conveyer main body 13 is disposed on the roller side frame 19. At least one of the plurality of conveying rollers 14 of the roller conveyer main body 13 is a driving roller, and the other rollers 14 are following rollers as described above. Power is transmitted between the driving roller and the following rollers via the belts.

The roller side frame 19 includes two long side walls 51*a* and 51*b*, and two short side walls 52*a* and 52*b*. The long side walls 51*a* and 51*b* have the same structure except for differences produced by the left hand wall and the right hand wall. Chiefly discussed hereinbelow is the long side wall 51*a*, and the same explanation concerning the long side wall 51*b* is not repeated.

As illustrated in FIGS. 4 and 21, the roller side frame 19 is a frame-shaped component constituted by the long side walls 51*a* and 51*b*, and the short side walls 52*a* and 52*b*. The roller side frame 19 is slightly larger than the belt side frame 18, and capable of storing the belt side frame 18 inside.

The long side wall 51*a* is constituted by a long flat component. The upper side of the long side wall 51*a* is bended at right angles to form a flange shape. Follower fixing holes 54*a* are formed at two points of the long side wall 51*a*. The follower fixing holes 54*a* are holes provided for supporting the cam followers 27 (depicted in long side wall 51*b*) such that the cam followers 27 are rotatable. The two cam followers 27 are disposed with a predetermined distance in the longitudinal direction of the long side wall 51*a*. Both the cam followers 27 are located in a portion deviated from the center of the long side wall 51*a*.

Figure 26:
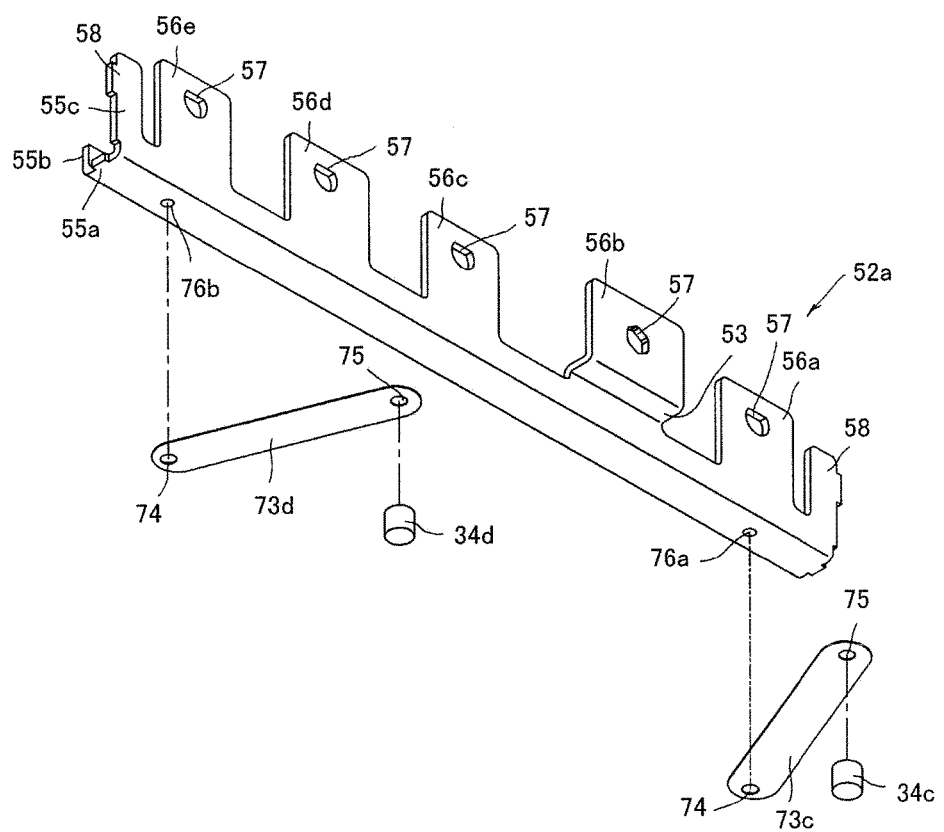
FIG. 26 is a perspective view of a short side wall of a roller side frame of the sub conveyer unit as viewed from the rear surface side.

Each of the short side walls 52*a* and 52*b* is a flat component shorter than the long side wall 51*a*. The short side wall 52*a* has a structure of a flat plate bended into a substantially U shape. As illustrated in FIG. 26, the short side wall 52*a* includes a bottom wall 55*a*, and vertical walls 55*b* and 55*c*. The vertical walls 55*b* and 55*c* rise from one and the other sides of the bottom wall 55*a*, respectively. The vertical wall 55c has a larger rising height from the bottom wall 55a than the corresponding height of the vertical wall 55b.

As illustrated in FIG. 26, fixing holes 76a and 76b are formed in the vicinity of one and the other end of the bottom wall 55a in the longitudinal direction.

Protrusions 56a through 56e protruding upward are provided on an upper edge portion of the vertical wall 55c. The respective protrusions 56a through 56e are disposed at predetermined equal intervals. The second protrusion 56b from the end has a larger protrusion length than the corresponding lengths of the other protrusions. The second protrusion 56b is bended at right angles in a direction away from the bottom portion 55a to produce a horizontal portion 53, and is further bended at the horizontal portion 53 to extend in the vertical direction. The heights of the respective protrusions 56a through 56e are uniform. A hole 57 is formed in the vicinity of each tip of the protrusions 56a through 56e.

Vertical walls 58 are provided at one and the other end of the short side wall 52a in the longitudinal direction. The vertical walls 58 are shorter than the respective protrusions 56a through 56e.

The short side wall 52b is composed of a plate-shaped component having substantially the same length as the length of the short side wall 52a. The short side wall 52b is bended in the longitudinal direction to produce a bottom wall 61a and a vertical wall 61b. Two fixing holes 62a and 62b are formed in the bottom wall 61a with a predetermined distance. Notches 65a through 65e are formed in the upper side of the vertical wall 61b at equal intervals. The notches 65a through 65e produce protrusions 63a through 63d protruding upward from the upper side portion of the vertical wall 61b.

Connection walls 64 continuing from the vertical wall 61b are provided at one and the other ends of the short side wall 52b, respectively. Each of the connection walls 64 includes side walls 64a and 64b crossing each other at right angles. The side wall 64a is connected to the vertical wall 61b at right angles. The width of the bottom wall 61a is equivalent to the width of the side wall 64a. The side wall 64a is bended with respect to the vertical wall 61b in the same direction as the direction of the bottom wall 61a. The side wall 64b crosses the side wall 64a at right angles, and extends to the side where the bottom wall 61a is not present.

The roller side frame 19 is a frame-shaped component which includes the long side walls 51a and 51b facing each other. One end of the long side wall 51a and one end of the long side wall 51b are connected with each other via the short side wall 52a, while the other end of the long side wall 51a and one end of the long side wall 51b are connected with each other via the short side wall 52b. The lower portion of one end of the long side wall 51a and the lower portion of one end of the long side wall 51b are connected to the vertical walls 58 on one and the other sides of the short side wall 52a, respectively.

The other end of the long side wall 51a and the other end of the long side wall 51b are connected to the side walls 64b of the connection walls 64 on one and the other sides of the short side wall 52b, respectively. Accordingly, a space 66b is formed below the connection walls 64 and the long side walls 51a and 51b. The cam followers 27 are rotatably fixed to the long side walls 51a and 51b in a state where the cam followers 27 are floating in the air above the space 66b. The cam followers 27 are disposed inside the frame of the roller side frame 19.

The main frame 12 and the belt side frame 18 are connected to each other via the four regulating units 72a through 72d (flat springs).

Each of the regulating units 72a through 72d is composed of a narrow and long thin plate component which has both rigidity and elasticity. As illustrated in FIG. 9, the holes 74 and 75 are formed in the vicinity of one and the other ends of each of the regulating units 72a through 72d.

The main frame 12 and the roller side frame 19 are connected with each other via the four regulating units 73a through 73d (flat springs). The regulating units 73a through 73d are components having configurations identical to the configurations of the regulating units 72a through 72d. The holes 74 and 75 are formed in the vicinity of one and the other ends, respectively, of each of the regulating units 73a through 73d.

The short side wall 52a of the roller side frame 19 is connected to the main frame 12 via the regulating units 73c and 73d. More specifically, the fixing hole 76a of the short side wall 52a and the hole 74 of the regulating unit 73c are aligned, and fixed to each other by a bolt and a nut. Moreover, the cylindrical fixing portion 34c of the main frame 12 and the hole 75 of the regulating unit 73c are aligned, and fixed to each other by a bolt and a nut as illustrated in FIG. 26. The regulating unit 73c is fixed to the fixing hole 76a of the short side wall 52a, and the cylindrical fixing portion 34c of the main frame 12. Similarly, the regulating unit 73d is fixed to the fixing hole 76b of the short side wall 52a, and the cylindrical fixing portion 34d of the main frame 12.

The short side wall 52b of the roller side frame 19 is connected to the main frame 12 via the regulating units 73a and 73b illustrated in FIG. 21. More specifically, the regulating units 73a and 73b are fixed to the fixing holes 62a and 62b of the short side wall 52b, and the cylindrical fixing units 34a and 34b (FIG. 4) of the main frame 12, respectively.

Figure 22B:
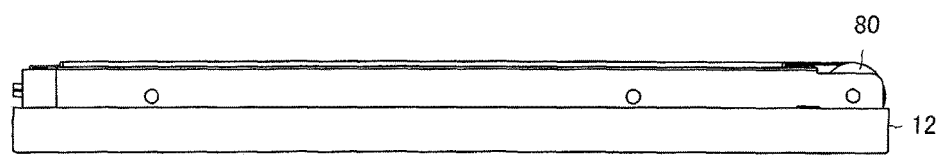
Figure 22C:
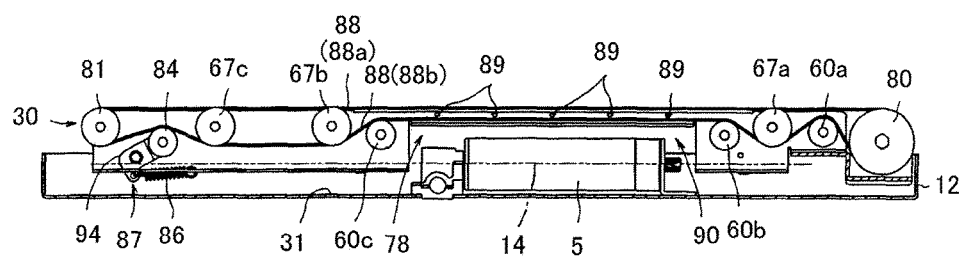

The transfer device 1 in a state of assembly of the respective components described above has a planar shape as illustrated in FIG. 22A, and a front shape as illustrated in FIG. 22B.

Figure 23A:
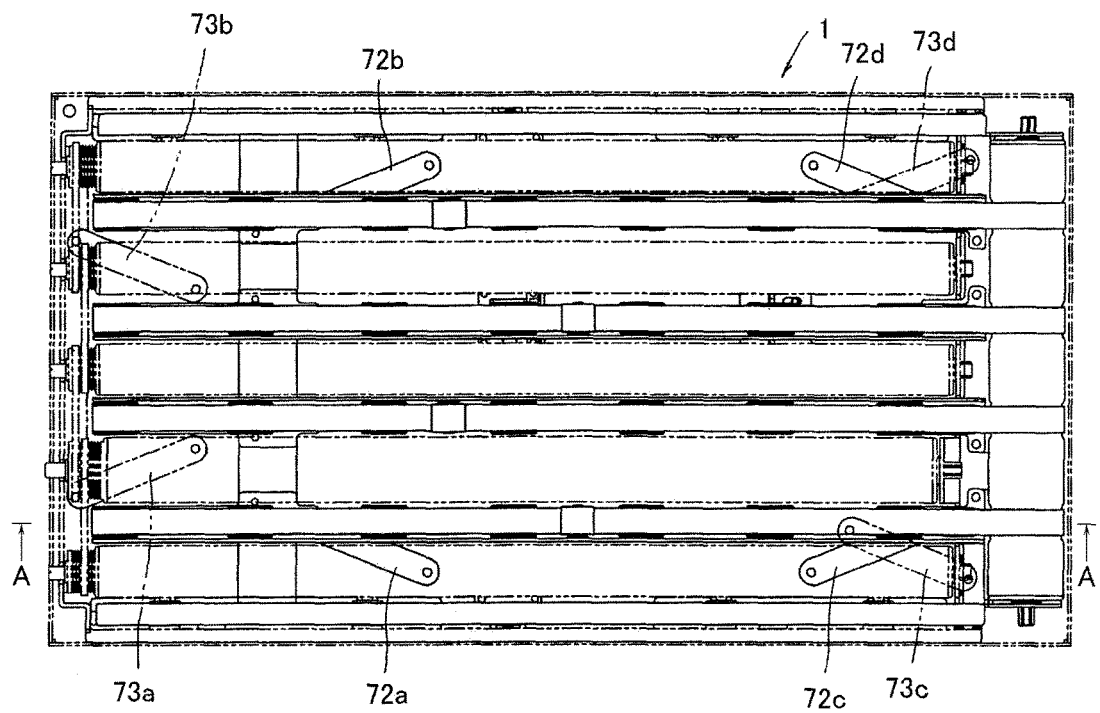
FIG. 23A is a plan view of the transfer device illustrated in FIG. 2, wherein the main conveyer unit and the regulating units connected to the main conveyer unit are depicted in solid lines, and other components are depicted by two-dot chain lines.
Figure 23B:
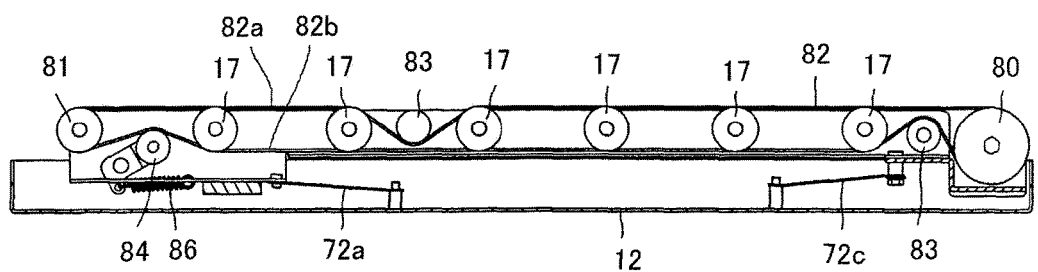
FIG. 23B is a cross-sectional view taken along a line A-A in FIG. 23A.
Figure 24A:
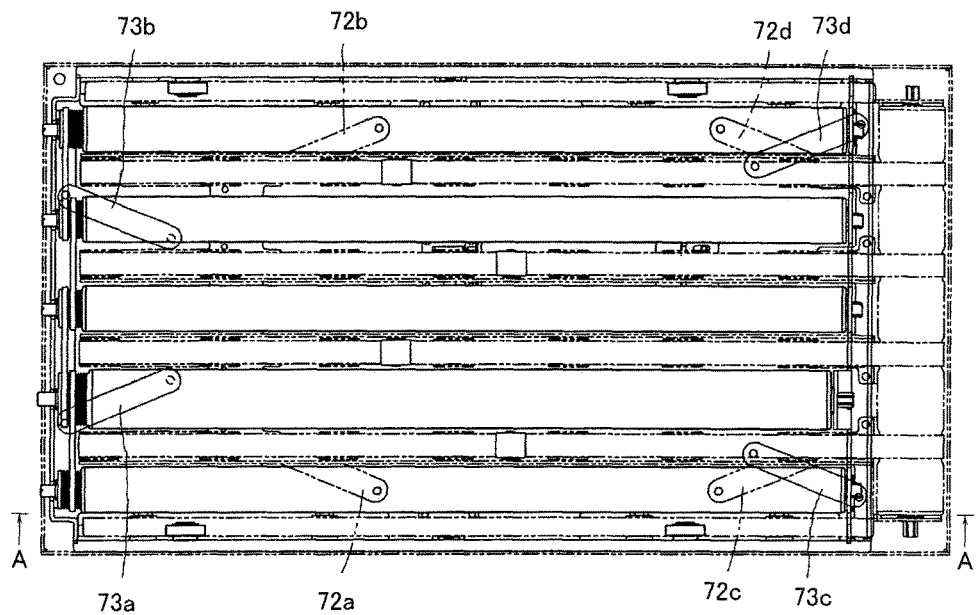
FIG. 24A is a plan view of the transfer device illustrated in FIG. 2, wherein the sub conveyer unit and the regulating units connected to the sub conveyer unit are depicted in solid lines, and other components are depicted by two-dot chain lines.

The positional relationship between the regulating units 72 and 73 is illustrated in FIGS. 23A and 23B and FIGS. 24A and 24B. As illustrated in FIGS. 23A and 24A, the eight regulating units 72 and 73 are disposed away from each other in the plan view. Accordingly, the main conveyer unit 3 and the sub conveyer unit 2 can be smoothly lifted and lowered without collision between the regulating units 72 and 73 in a bended state of the regulating units 72 and 73.

Figure 24B:
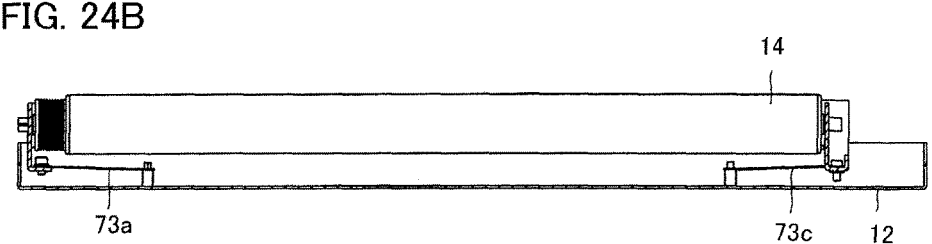
FIG. 24B is a cross-sectional view taken along a line A-A in FIG. 24A.

On the other hand, the eight regulating units 72 and 73 reside in the same area in the height direction as illustrated in FIGS. 23B and 24B. Moreover, each height of the eight regulating units 72 and 73 is small. Accordingly, the overall height of the transfer device 1 decreases.

Operation of the transfer device 1 is hereinafter described.

In setting the conveying direction of the conveyed object 25 illustrated in FIG. 1, the transfer device 1 is operated in the following manner.

For conveying the conveyed object 25 from the upstream side main conveying line 22 to the downstream side main conveying line 23, the main conveyer unit 3 of the transfer device 1 is lifted to position the belts 82 and 88 on the conveying passage, while the sub conveyer unit 2 is lowered to retract the conveying rollers 14 to an area below the conveying passage.

More specifically, the horizontal movement members 11 are moved rightward by driving the geared motor 5 to position the cam followers 36 of the main conveyer unit 3 on the first high portion 7a and the third high portion 7c, and position the cam followers 27 of the sub conveyer unit 2 on the first low portion 8a (cam recess 28a) and the third low portion 8c (cam recess 29a) as illustrated in FIG. 7C. As a result, the main conveyer unit 3 moves to a lifted position, while the sub conveyer unit 2 moves to a lowered position. The belts 82 and 88 are positioned on the conveying surface, and thus the conveyed object 25 is conveyed toward the downstream side main conveying line 23 by the main conveyer unit 3 of the transfer device 1.

During this period, the respective regulating units 72 and 73 guide the respective main conveyer unit 3 and the sub conveyer unit 2 in the vertical direction as illustrated in FIGS. 7A and 7B.

For conveying the conveyed object 25 from the upstream side main conveying line 22 to the sub conveying line 24, the sub conveyer unit 2 of the transfer device 1 is lifted to position the conveying rollers 14 on the conveying passage, while the main conveyer unit 3 is lowered to retract the belts 82 and 88 to an area below the conveying passage.

More specifically, the horizontal movement members 11 are moved leftward by driving the geared motor 5 to position the cam followers 36 of the main conveyer unit 3 on the second low portion 8b (cam recess 28a) and the fourth low portion 8d (cam recess 29b), and position the cam followers 27 of the sub conveyer unit 2 on the first high portion 7a and the third high portion 7c as illustrated in FIG. 8C. As a result, the main conveyer unit 3 moves to a lowered position, while the sub conveyer unit 2 moves to a lifted position. The conveying rollers 14 are positioned on the conveying surface, and thus the conveyed object 25 is conveyed toward the sub conveying line 24 by the sub conveyer unit 2 of the transfer device 1.

During this period, the respective regulating units 72 and 73 guide the respective main conveyer unit 3 and the sub conveyer unit 2 in the vertical direction as illustrated in FIGS. 8A and 8B.

According to the embodiment described herein, each of the regulating units 72 and 73 is composed of a flat spring. The sub conveyer unit 2 and the main conveyer unit 3 are guided to linearly move upward and downward in a straight line by utilizing bending of the elastic flat springs.

According to the present invention, however, a tiltable plate body may be employed in place of each of the flat springs.

Figure 27A:
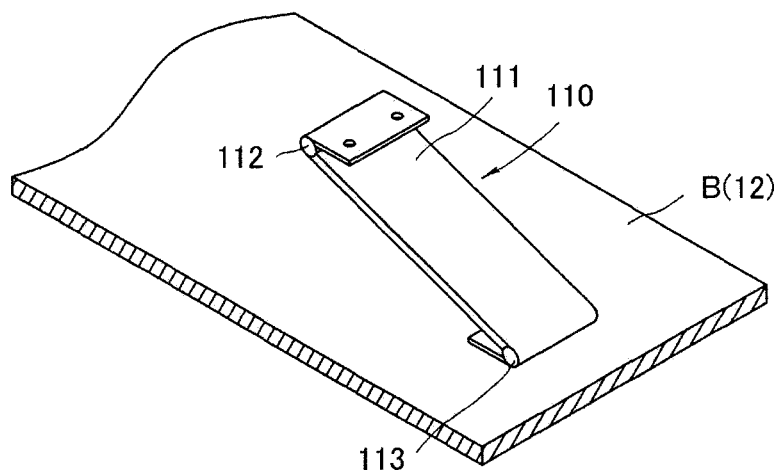
Figure 27B:
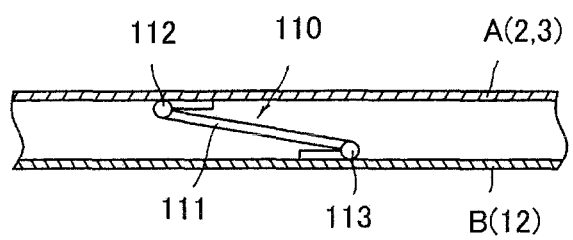
Figure 27C:
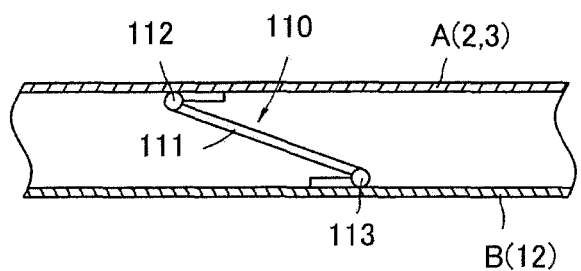

FIGS. 27A through 27D illustrate an example of a tiltable plate body 111 employed as a regulating unit 110. The main body of the regulating unit 110 corresponds to the plate body 111 which has small elasticity and does not easily bend. On the other hand, both ends of the regulating unit 110 are connected to the frame A (main conveyer unit 3 or sub conveyer unit 2) and the plane B (main frame 12) via hinges 112 and 113. Accordingly, the regulating unit 110 comes into either a substantially horizontal posture as illustrated in FIG. 27B, or a tilted posture as illustrated in FIG. 27C. There is certain backlash between the hinges 112 and 113. This backlash absorbs a change of the distance between the hinges 112 and 113 in the longitudinal direction resulting from a change into the tilted posture of the plate body 111.

According to this embodiment, the regulating unit 110 is a plate body which is tiltable in the vertical direction with respect to the flat surface, but is not easily twisted. Moreover, the flat surface of each of the regulating units 110 extends substantially in parallel with the virtual plane of the frame A, and the flat surface constituted by the plane B. Accordingly, as observed for each of the regulating units 110, the frame A can move in a straight line in the vertical direction with respect to the plane B in accordance with tilts of the regulating units 110. More specifically, tilts of the respective regulating units 110 can move the frame A vertically without deviation when the frame A is lifted by the cams.

Figure 27D:
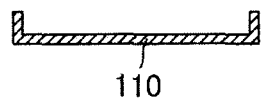

Each of the regulating units 110 according to this embodiment is composed of a plate body and not required to bend. In this case, for example, each of the regulating units 110 may have a U-shaped cross section as illustrated in FIG. 27D. Accordingly, each of the regulating units 110 is not required to have a flat shape.

A regulating unit 120 illustrated in FIGS. 28A through 28D also includes a tiltable plate body 121. However, this example does not include a hinge.

More specifically, a main body of the regulating unit 120 corresponds to a plate body 121 which has small elasticity and does not easily bend. On the other hand, holes 126 and 127 are formed at one and the other ends of the regulating unit 120. Connection elements 123 and 125 composed of pins or screws are inserted into the holes 126 and 127, and connected to the frame A (main conveyer unit 3 or sub conveyer unit 2) and the plane B (main frame 12).

According to this embodiment, the holes 126 and 127 formed at one and the other ends of the regulating unit 120 are larger than the connection elements 123 and 125 constituted by pins or screws. Moreover, the connection elements 123 and 125 only slightly fix both the ends of the regulating unit 120.

Figure 28A:
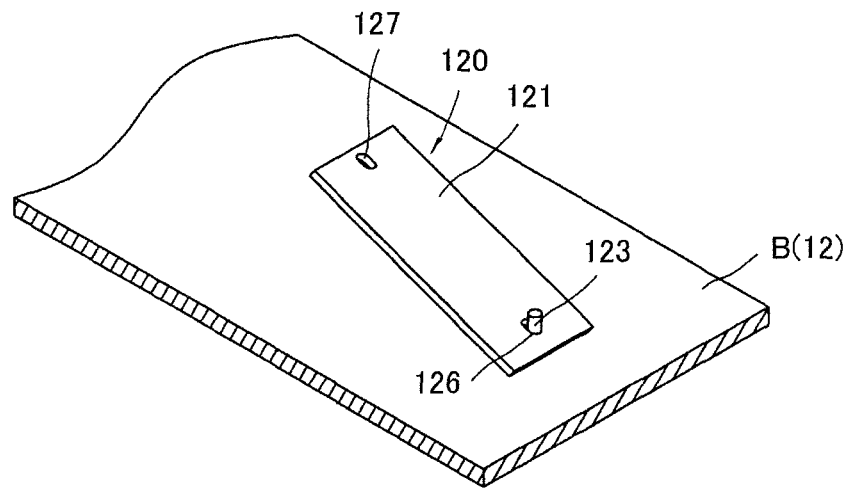
Figure 28B:
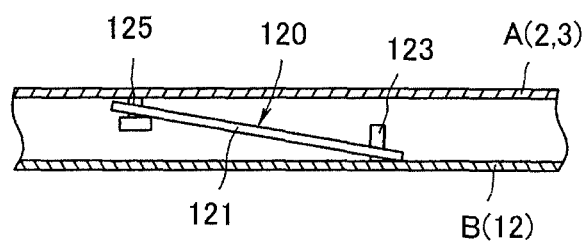
Figure 28C:
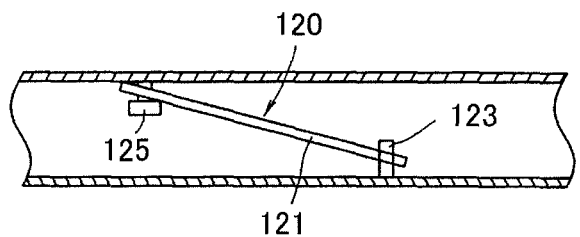

Accordingly, the regulating unit 120 is allowed to come into a substantially horizontal posture as illustrated in FIG. 28B, and a tilted posture as illustrated in FIG. 28C.

Figure 28D:
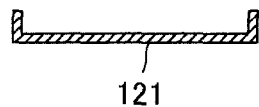

The regulating unit 120 according to this embodiment is constituted by a plate body and not required to bend. In this case, for example, the regulating units 120 may have a U-shaped cross section as illustrated in FIG. 28D. Accordingly, the regulating unit 120 is not required to have a flat shape.

Disclosed in the above-mentioned embodiments are the plate-shaped regulating units 72, 73, 110, and 120. However, a linear component may be employed to constitute a regulating unit 130.

Figure 29A:
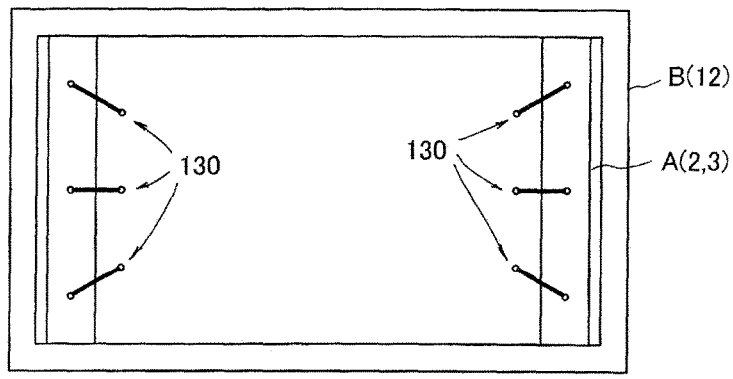
Figure 29B:
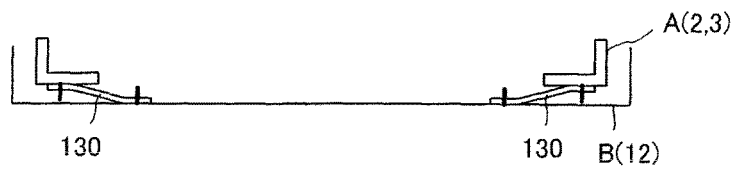
Figure 29C:

FIGS. 29A through 29C illustrate the regulating unit 130 constituted by a linear material such as piano wire. The regulating unit 130 employed in this embodiment is composed of a linear material such as piano wire, and has elasticity in a bending direction.

According to this embodiment, the frame A (main conveyer unit 3 or sub conveyer unit 2) is connected to the plane B by a large number of the regulating units 130. The frame A is allowed to move in a straight line in the vertical direction with respect to the plane B also in this embodiment. More specifically, tilts of the respective regulating units 130 can move the frame A vertically without deviation when the frame A is lifted by the cams.

The invention claimed is:
1. A transfer device comprising:
a frame;
a main conveyer unit having a main conveying passage disposed in a fixed planar area and conveying a conveyed object in a fixed direction;
a sub conveyer unit having a sub conveying passage disposed in a planar area identical to the planar area of the main conveying passage and conveying the object in a direction crossing the conveying direction of the main conveying passage;

a lifting and lowering unit for lifting or lowering at least one of the main conveyer unit and the sub conveyer unit, the lifting and lowering unit lifting one of the conveying passages to a position above the other conveying passage to convey the object in a desired direction; and a regulating unit provided for allowing linear upward and downward movement of at least one of the main conveyer unit and the sub conveyer unit, wherein the regulating unit is a plate body that has elasticity and bends in a fixed direction, and wherein the regulating unit is attached between the frame and the main conveyer unit or the sub conveyer unit in such a posture that a bending direction is aligned with an upward and downward movement direction of the main conveyer unit or the sub conveyer unit.

2. The transfer device according to claim 1, wherein a plurality of the regulating units are provided between the frame and the main conveyer unit or the sub conveyer unit.

3. The transfer device according to claim 1,
wherein one of the main conveyer unit and the sub conveyer unit is a roller conveyer device that includes a plurality of rollers disposed in parallel,
wherein the other conveyer unit is a belt conveyer device including a plurality of belt conveyers disposed in parallel,
wherein the belts composing the belt conveyer device are disposed between the rollers constituting the roller conveyer device, and
wherein tension is constantly applied to the belts by a tensioner.

4. The transfer device according to claim 1,
wherein the lifting and lowering unit comprises a geared motor, and a lifting and lowering mechanism composed of a combination of a plurality of parts, and
wherein the lifting and lowering mechanism comprises a pinion gear, a rack, a cam unit that linearly moves by the rack, and a cam follower provided on the main conveying unit or the sub conveying unit.

5. The transfer device according to claim 1,
wherein the lifting and lowering unit comprises a motor,
wherein the conveying bodies of one of the conveying units are rotating bodies composed of rollers or small rotating body groups coaxially arranged whereas the conveying bodies of the other conveying unit are narrow conveyers having a small width,
wherein the rotating bodies are disposed in parallel with a fixed interval whereas the narrow conveyers are disposed between the rotating bodies and appear from between the rotating bodies, and
wherein a position of a part or the whole of the motor in the height direction is higher than a height of a lowermost end of the rotating bodies, and higher than a height of a lower end of a rotational track or traveling track of the narrow conveyers.

6. A transfer device comprising:
a frame;
a main conveyer unit having a main conveying passage disposed in a fixed planar area and conveying a conveyed object in a fixed direction;
a sub conveyer unit having a sub conveying passage disposed in a planar area identical to the planar area of the main conveying passage and conveying the object in a direction crossing the conveying direction of the main conveying passage;

a lifting and lowering unit for lifting or lowering at least one of the main conveyer unit and the sub conveyer unit, the lifting and lowering unit lifting one of the conveying passages to a position above the other conveying passage to convey the object in a desired direction; and a regulating unit provided for allowing linear upward and downward movement of at least one of the main conveyer unit and the sub conveyer unit, wherein the regulating unit is a plate body that is not easily twisted and that is configured to change a posture of the regulating unit into a tilted posture, a flat surface of the regulating unit extending substantially in parallel with the fixed planar area, and wherein the regulating unit is attached between the frame and the main conveyer unit or the sub conveyer unit in such a posture that a tilting direction is aligned with an upward and downward movement direction of the main conveyer unit or the sub conveyer unit.

7. The transfer device according to claim 6, wherein a plurality of the regulating units are provided between the frame and the main conveyer unit or the sub conveyer unit.

8. The transfer device according to claim 6,
wherein one of the main conveyer unit and the sub conveyer unit is a roller conveyer device that includes a plurality of rollers disposed in parallel,
wherein the other conveyer unit is a belt conveyer device including a plurality of belt conveyers disposed in parallel,
wherein the belts composing the belt conveyer device are disposed between the rollers constituting the roller conveyer device, and
wherein tension is constantly applied to the belts by a tensioner.

9. The transfer device according to claim 6,
wherein the lifting and lowering unit comprises a geared motor, and a lifting and lowering mechanism composed of a combination of a plurality of parts, and
wherein the lifting and lowering mechanism comprises a pinion gear, a rack, a cam unit that linearly moves by the rack, and a cam follower provided on the main conveying unit or the sub conveying unit.

10. The transfer device according to claim 6,
wherein the lifting and lowering unit comprises a motor,
wherein the conveying bodies of one of the conveying units are rotating bodies composed of rollers or small rotating body groups coaxially arranged whereas the conveying bodies of the other conveying unit are narrow conveyers having a small width,
wherein the rotating bodies are disposed in parallel with a fixed interval whereas the narrow conveyers are disposed between the rotating bodies and appear from between the rotating bodies, and
wherein a position of a part or the whole of the motor in the height direction is higher than a height of a lowermost end of the rotating bodies, and higher than a height of a lower end of a rotational track or traveling track of the narrow conveyers.

* * * * *